(12) United States Patent
Baldemair et al.

(10) Patent No.: US 9,848,390 B2
(45) Date of Patent: *Dec. 19, 2017

(54) POWER CONTROL FOR ACK/NACK FORMATS WITH CARRIER AGGREGATION

(71) Applicant: TELEFONAKTIEBOLAGET L M ERICSSON (PUBL), Stockholm (SE)

(72) Inventors: Robert Baldemair, Solna (SE);
Jung-Fu Cheng, Freemont, CA (US);
Dirk Gerstenberger, Vallentuna (SE);
Daniel Larsson, Vallentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 205 days.

This patent is subject to a terminal disclaimer.

(21) Appl. No.: 14/807,585

(22) Filed: Jul. 23, 2015

(65) Prior Publication Data
US 2015/0334662 A1 Nov. 19, 2015

Related U.S. Application Data

(60) Continuation of application No. 14/053,102, filed on Oct. 14, 2013, now Pat. No. 9,125,161, which is a
(Continued)

(51) Int. Cl.
*H04W 52/14* (2009.01)
*H04L 1/18* (2006.01)
(Continued)

(52) U.S. Cl.
CPC ........ *H04W 52/146* (2013.01); *H04L 1/1812* (2013.01); *H04W 52/325* (2013.01);
(Continued)

(58) Field of Classification Search
CPC . H04W 52/146; H04W 52/08; H04W 52/325; H04W 52/34

See application file for complete search history.

(56) References Cited

U.S. PATENT DOCUMENTS

| | | |
|---|---|---|
| 6,745,013 B1 | 6/2004 | Porter |
| 2004/0166888 A1 | 8/2004 | Ahn |

(Continued)

FOREIGN PATENT DOCUMENTS

| | | |
|---|---|---|
| RU | 2332797 C2 | 1/2006 |
| WO | 2000/59130 A1 | 10/2000 |

(Continued)

OTHER PUBLICATIONS

Ericsson, Power Control for PUCCH Format 3 with SORTD, R1-110028, 3GPP TSG-RAN WG1 Meeting #63bis, Dublin, Ireland, Jan. 17-21, 2010.

(Continued)

*Primary Examiner* — Benjamin Lamont

(57) ABSTRACT

A system and method for determining a Physical Uplink Control Channel (PUCCH) power control parameter $h(n_{CQI}, n_{HARQ})$ for two Carrier Aggregated (CA) PUCCH formats—PUCCH format 3 and channel selection. The value of $h(n_{CQI}, n_{HARQ})$ may be based on only a linear function of $n_{HARQ}$ for both of the CA PUCCH formats. Based on the CA PUCCH format configured for the User Equipment (UE), the e-Node B (eNB) may instruct the UE to select or apply a specific linear function of $n_{HARQ}$ as a value for the power control parameter $h(n_{CQI}, n_{HARQ})$, so as to enable the UE to more accurately establish transmit power of its PUCCH signal. Values for another PUCCH power control parameter—$\Delta_{F\_PUCCH}(F)$—are also provided for use with PUCCH format 3. A new offset parameter may be signaled for each PUCCH format that has transmit diversity configured.

5 Claims, 11 Drawing Sheets

Related U.S. Application Data division of application No. 13/078,212, filed on Apr. 1, 2011, now Pat. No. 8,582,518.

(60) Provisional application No. 61/412,068, filed on Nov. 10, 2010, provisional application No. 61/411,527, filed on Nov. 9, 2010.

(51) Int. Cl.
| | | |
|---|---|---|
| *H04W 76/04* | (2009.01) | |
| *H04W 52/32* | (2009.01) | |
| *H04W 52/24* | (2009.01) | |
| *H04W 52/08* | (2009.01) | |
| *H04W 52/34* | (2009.01) | |

(52) U.S. Cl.
CPC .......... *H04W 76/048* (2013.01); *H04W 52/08* (2013.01); *H04W 52/241* (2013.01); *H04W 52/34* (2013.01)

(56) References Cited

U.S. PATENT DOCUMENTS

| | | | |
|---|---|---|---|
| 2008/0287155 A1 | 11/2008 | Xu | |
| 2011/0038271 A1 | 2/2011 | Shin | |
| 2011/0096815 A1 | 4/2011 | Shin | |
| 2011/0243007 A1 | 10/2011 | Xiao | |
| 2011/0286391 A1 | 11/2011 | Chen | |
| 2011/0292887 A1 | 12/2011 | Baldemair | |
| 2012/0170533 A1* | 7/2012 | Ahn ..................... | H04B 7/0689 370/329 |

FOREIGN PATENT DOCUMENTS

| | | |
|---|---|---|
| WO | 2011031059 A2 | 3/2011 |
| WO | 2011041555 A2 | 4/2011 |

OTHER PUBLICATIONS

Ericsson, Power Control for PUCCH Format 3, R1-105859, 3GPP TSG RAN WG1 Meeting #63, Jacksonville, USA, Nov. 15-19, 2010.

ZTE, Power Control for PUCCH for LTE-A TDD, R1-110984, 3GPP TSG-RAN WG1 #64, Taipei, Taiwan, Feb. 21-25, 2011.

3GPP TS 36.213 V9.3.0 3rd Generation Partnership Project; Technical Specification Group Radio Access Network; Evolved Universal Terrestrial Radio Access (E-UTRA); Physical layer procedures (Release 9), Sep. 2010.

3GPP TR 36.814 V1.5.0 3rd Generation Partnership Project; Technical Specification Group Radio Access Network; Further Advancements for E-UTRA Physical Layer Aspects (Release 9), Nov. 2009. Motorola; Introduction of Rel-10 LTE-Advanced Features in 36.213. 3GPP Draft; R1-105111 26213 Draft CR. Sep. 14, 2010.

3GPP; 3rd Generation Partnership Project; Technical Specification Group Radio Access Network; Evolved Universal Terrestrial Radio Access (E-UTRA); Physical Channels and Modulation (Release 9); 3GPP TS 36.211 V9.1.0 (Mar. 2010) Mar. 2010.

Panasonic; Mapping Tables for Format 1b with Channel Selection; 3GPP TSG RAN WG1 Meeting #62bis; R1-105476; Oct. 11-15, 2010.

3GPP; 3rd Generation Partnership Project; Technical Specification Group Radio Access Network; Evolved Universal Terrestrial Radio Access (E-UTRA); Multiplexing and Channel Coding (Release 9); 3GPP TS 36.212 V9.1.0 (Mar. 2010) Mar. 2010.

Samsung; PUCCH Power Control for DL CA. 3GPP TSG RAN WG1 Meeting #62bis; R1-105367; Oct. 11-15, 2010.

Ericsson, Evaluation of PUCCH Proposals for Carrier Aggregation; 3GPP TSG RAN WG1 Meeting #61bis; R1-103507; Jun. 28-Jul. 2, 2010.

Ericsson; Further Details on Slow Codebook Adaptation for PUCCH Format 3; 3GPP TSG RAN WG1 Meeting #62bis; R1-105312; Oct. 11-15, 2015.

Nokia; Way Forward on A/N mapping table for channel selection; 3GPP TSG RAN WG1 Meeting #62bis; R1-105807; Oct. 11-15, 2010.

Ericsson; Power control for PUCCH format 3; R1-1 05317, 3GPP TSG WG1 Meeting #62bis; Xi'an, China, Oct. 11-15, 2010 (pp. 1-2).

3rd Generation Partnership Project; Technical Specification Radio Access Group; Evolved Universal Terrestrial Radio Access (E-UTRA); Physical layer procedures (Release 9); 3GPP TS 36.213 V9.2.0 (Jun. 2010) pp. 1-80.

Nokia, et al.; Mapping table and other remaining details for Format 1 b with Channel Selection, R1-105520; 3GPP TSG RAN WG1 Meeting #62bis, Xian, China; Oct. 11-15, 2010; pp. 1-6.

3GPP TR 36.814 V9.0.0 3rd Generation Partnership Project; Technical Specification Group Radio Access Network; Evolved Universal Terrestrial Radio Access (E-UTRA); Further Advancements for E-UTRA Physical Layer Aspects (Release 9), Mar. 2010.

\* cited by examiner

POWER CONTROL FOR ACK/NACK FORMATS WITH CARRIER AGGREGATION

CROSS-REFERENCE TO RELATED APPLICATIONS

This application is a continuation of U.S. patent application Ser. No. 14/053,102, filed Oct. 14, 2013, which is a divisional of co-pending U.S. patent application Ser. No. 13/078,212, filed Apr. 1, 2011, which claims the priority benefit under 35 U.S.C. §119(e) of U.S. Provisional Application No. 61/411,527, filed Nov. 9, 2010, and U.S. Provisional Application No. 61/412,068, filed Nov. 10, 2010, the disclosures of which are incorporated herein by reference in their entireties.

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND

The present invention relates to power control in wireless communication systems. More particularly, and not by way of limitation, the present invention is directed to a system and method for controlling transmit power of a Physical Uplink Control Channel (PUCCH) signal in a cellular wireless network with Carrier Aggregation (CA).

In a wireless communication system (e.g., a third generation (3G) or a Long Term Evolution (LTE) fourth generation (4G) cellular telephone network), a base station (e.g., an evolved Node-B or eNodeB (eNB) or a similar entity) may transmit wireless channel resource allocation information to a mobile handset or User Equipment (UE) via a downlink control signal, such as the Physical Downlink Control Channel (PDCCH) signal in Third Generation Partnership Project (3GPP) 3G and 4G networks. Modern cellular networks use Hybrid Automatic Repeat Request (HARQ) in which, after receiving this PDCCH downlink transmission (i.e., transmission from a base station to a mobile device), the UE may attempt to decode it and report to the base station whether the decoding was successful (ACK or Acknowledge) or not (NACK or Negative Acknowledge). Such reporting may be performed by the UE using an uplink transmission (i.e., transmission from a mobile device to a base station in a cellular network), such as the Physical Uplink Control Channel (PUCCH) signal in the 3G and 4G networks. Thus, the uplink control signal PUCCH from the mobile terminal to the base station can include hybrid-ARQ acknowledgements (ACK/NACK) for received downlink data. The PUCCH may also additionally include terminal reports (e.g., in the form of one or more Channel Quality Indicator (CQI) bits) related to the downlink channel conditions. Such reports may be used by the base station to assist it in future downlink scheduling of the mobile handset. The PUCCH may further include scheduling requests by the UE, indicating that the mobile terminal or UE needs uplink resources for uplink data transmissions.

The general operations of the LTE physical channels are described in various Evolved Universal Terrestrial Radio Access (E-UTRA) specifications such as, for example, 3GPP's Technical Specifications (TS) 36.201 ("Physical Layer: General Description"), 36.211 ("Physical Channels and Modulation"), 36.212 ("Multiplexing and Channel Coding"), 36.213 ("Physical Layer Procedures"), and 36.214 ("Physical Layer—Measurements"). These specifications may be consulted for additional reference and are incorporated herein by reference.

It is observed here that LTE Release-8 (Rel-8) now has been standardized to support operating bandwidths of up to 20 MHz. However, in order to meet International Mobile Telecommunications (IMT)-Advanced requirements, 3GPP has initiated work on LTE Release-10 (Rel-10) ("LTE Advanced") to support bandwidths larger than 20 MHz. One important requirement in LTE Rel-10 is to assure backward compatibility with LTE Rel-8. This includes spectrum compatibility, i.e., an LTE Rel-10 carrier, wider than 20 MHz, should appear as a number of (smaller) LTE carriers to an LTE Rel-8 terminal. Each such smaller carrier can be referred to as a Component Carrier (CC). It is observed here that during initial deployments of LTE Rel-10, the number of LTE Rel-10-capable terminals may be smaller compared to many LTE legacy terminals (e.g., Rel-8 terminals). Therefore, it is necessary to assure an efficient use of a wide (Rel-10) carrier also for legacy terminals. In other words, it should be possible to implement carriers where legacy terminals can be scheduled in all parts of the wideband LTE Rel-10 carrier. One way to obtain this efficient usage is by means of Carrier Aggregation (CA). CA implies that an LTE Rel-10 terminal can receive multiple CCs, where each CC has, or at least the possibility to have, the same structure as an Rel-8 carrier. FIG. 1 illustrates the principle of CC aggregation. As shown in FIG. 1, an operating bandwidth of 100 MHz (indicated by reference numeral "2") in Rel-10 may be constructed by the aggregation of five (contiguous, for simplicity) smaller bandwidths of 20 MHz (in compliance with Rel-8 requirements) as indicated by reference numerals "4" through "8". It is noted here that Rel-10 supports aggregation of up to five carriers, each with a bandwidth of up to 20 MHz. Thus, for example, if desired, carrier aggregation in Rel-10 also may be used to aggregate two carriers of 5 MHz bandwidth each. The carrier aggregation in uplink and downlink may thus support higher data rates than possible in legacy communication systems (i.e., UE's operating under 3GPP Rel-8 or below). UE's capable of operating only over a single Downlink/Uplink (DL/UL) pair may be referred to as "Legacy UE's", whereas UE's capable of operating over multiple DL/UL CCs may be referred to as "Advanced-UE's".

The number of aggregated CCs as well as the bandwidth of the individual CC may be different for uplink and downlink. A "symmetric configuration" refers to the case where the number of CCs in downlink and uplink is the same, whereas an "asymmetric configuration" refers to the case that the number of CCs is different in uplink and downlink. It is important to note that the number of CCs configured in the network may be different from the number of CCs seen by a terminal (or UE): A terminal may, for example, support more downlink CCs than uplink CCs, even though the network offers the same number of uplink and downlink CCs. The link between DL CCs and UL CCs can be UE-specific.

Scheduling of a CC is done on the PDCCH via downlink assignments. Control information on the PDCCH may be formatted as a Downlink Control Information (DCI) message. In Rel-8, a terminal only operates with one DL and one UL CC. Therefore, the association between DL assignment, UL grants, and the corresponding DL and UL CCs is clear in Rel-8. However, in Rel-10, two modes of CA need to be distinguished: The first mode is very similar to the operation of multiple Rel-8 terminals—i.e., a DL assignment or UL grant contained in a DCI message transmitted on a CC is either valid for the DL CC itself or for associated (either via cell-specific or UE-specific linking) UL CC. A second mode of operation augments a DCI message with the Carrier Indicator Field (CIF). A DCI message containing a DL assignment with CIF is valid for that DL CC indicated with CIF and a DCI containing an UL grant with CIF is valid for the indicated UL CC.

It is observed here that it is desirable to control transmit power for a transmit signal (e.g., a PUCCH signal to be transmitted from a UE to a base station) while exchanging data between a base station (BS) and a UE. In particular, transmit power control of an uplink channel is important in terms of power consumption of the UE and service reliability. In uplink transmission, if a transmit power is too weak, the BS cannot receive a transmit signal of the UE. On the other hand, if the transmit power is too strong, the transmit signal may act as interference to a transmit signal of another UE, and may increase battery consumption of the UE transmitting such a powerful signal.

DCI messages for downlink assignments (of uplink resources) contain, among others, resource block assignment, modulation and coding scheme related parameters, HARQ redundancy version, etc. In addition to those parameters that relate to the actual downlink transmission, most DCI formats for downlink assignments also contain a bit field for Transmit Power Control (TPC) commands. These TPC commands may be used by eNB to control the uplink power of the corresponding PUCCH that is used to transmit the HARQ feedback (in response to the received DCI message via PDCCH). More generally, TPC commands are used to control transmit power of a channel between a base station (BS) and a UE.

Each DL assignment may be scheduled with its own DCI message on the PDCCH. Since Rel-8 DCI formats or formats very similar to Rel-8 are also used for Rel-10, each received DCI message in Rel-10 therefore contains a TPC bit field providing an adjustment value for the transmit power for PUCCH. It is observed here that the operating point for all PUCCH formats is common. That is, Rel-8 PUCCH formats 1/1a/1b/2/2a/2b and additional PUCCH formats in Rel-10—i.e., PUCCH format 3 and channel selection based HARQ feedback schemes—all use the same power control loop, with the exception of the power control parameters $h(n_{CQI}, n_{HARQ})$ and $\Delta_{F\_PUCCH}(F)$ (defined below with reference to equation (1)). These parameters at least take into account different performance and payload sizes for the different PUCCH formats. Therefore these parameters are individually determined per PUCCH format.

In Rel-8, the PUCCH power control is defined as follows:

$$P_{PUCCH}(i) = \min\{P_{CMAX}, P_{0\_PUCCH} + PL + h(n_{CQI}, n_{HARQ}) + \Delta_{F\_PUCCH}(F) + g(i)\} \quad (1)$$

In the above equation (1), "$P_{PUCCH}(i)$" refers to PUCCH transmit power for subframe "i" (e.g., a 1 ms subframe in a 10 ms radio frame); "$P_{CMAX}$" refers to configured maximum transmit power (at UE) for PUCCH CC (e.g., a UL PCC (Uplink Primary CC)); "$P_{0\_PUCCH}$" refers to desired PUCCH receive power (at eNB or other similar control node in LTE) signaled by higher layers (in an LTE network); "$h(n_{CQI}, n_{HARQ})$" refers to an offset parameter that depends on the number "$n_{CQI}$" ($\geq 0$) of CQI bits or the number "$n_{HARQ}$" ($\geq 0$) of HARQ bits (in the PUCCH signal to be transmitted by the UE), to retain the same energy per information bit; "$\Delta_{F\_PUCCH}(F)$" refers to an offset parameter that depends on the PUCCH format (of the PUCCH signal transmitted by the UE), to give sufficient room for different receiver (e.g., eNB or other base station) implementation and radio conditions;

$$"g(i) = g(i) + \sum_{m=0}^{M-1} \delta_{PUCCH}(i - k_m)"$$

refers to an accumulated power adjustment value derived from TPC command "$\delta_{PUCCH}(i)$". The values "M" and "$k_m$" depend on whether the duplexing mode (e.g., the mode of communication between UE and eNB) is Frequency Division Duplex (FDD) or Time Division Duplex (TDD); and "PL" refers to path loss. It is known that, in Rel-8, PUCCH supports multiple formats such as format 1, 1 a, 1 b, 2, 2a, 2b, and a mix of formats 1/1a/1 b and 2/2a/2b. These PUCCH formats are used in the following manner: PUCCH format 1 uses a single Scheduling Request Indicator (SRI) bit, PUCCH format 1a uses a 1-bit ACK/NACK, PUCCH format 1b uses a 2-bit ACK/NACK, PUCCH format 2 uses periodic CQI, PUCCH format 2a uses periodic CQI with 1-bit ACK/NACK, and PUCCH format 2b uses periodic CQI with 2-bit ACK/NACK.

In Rel-8/9, $h(n_{CQI}, n_{HARQ})$ is defined as follows:
 a. For PUCCH formats 1, 1a and 1b, $h(n_{CQI}, n_{HARQ}) = 0$
 b. For PUCCH formats 2, 2a, 2b and normal cyclic prefix $$h(n_{CQI}, n_{HARQ}) = \begin{cases} 10 \log_{10}\left(\frac{n_{CQI}}{4}\right) & \text{if } n_{CQI} \geq 4 \\ 0 & \text{otherwise} \end{cases}$$

c. For PUCCH format 2 and extended cyclic prefix $$h(n_{CQI}, n_{HARQ}) = \begin{cases} 10 \log_{10}\left(\frac{n_{CQI} + n_{HARQ}}{4}\right) & \text{if } n_{CQI} + n_{HARQ} \geq 4 \\ 0 & \text{otherwise} \end{cases}$$

SUMMARY

As mentioned above, one of the transmit power control parameters—i.e., $h(n_{CQI}, n_{HARQ})$—is defined for various PUCCH formats supported in Rel-8. Furthermore, it has been proposed for the PUCCH format 3 in Rel-10 to apply $h(n_{CQI}, n_{HARQ}) = 10 \log_{10}(n_{HARQ})$. However, the currently proposed logarithmic value of $h(n_{CQI}, n_{HARQ})$ for the PUCCH format 3 may not provide accurate power control. Therefore, it is desirable to have a better determination of $h(n_{CQI}, n_{HARQ})$ for both of the CA PUCCH formats in Rel-10 (i.e., PUCCH format 3 and channel selection) so as to retain the same energy per information bit transmitted through the PUCCH signal (from UE). It is further desirable to provide a methodology to determine values for the power control parameter $\Delta_{F\_PUCCH}(F)$ for PUCCH format 3 in Rel-10 to facilitate more accurate power control of uplink transmissions.

The present invention provides a solution to the above-mentioned need to determine $h(n_{CQI}, n_{HARQ})$ more accurately for the two CA PUCCH formats in Rel-10. In one embodiment of the present invention, $h(n_{CQI}, n_{HARQ})$ is based on a linear function of $n_{HARQ}$ for both of the CA PUCCH formats in Rel-10. Based on the CA PUCCH format configured for the UE, the eNB may instruct the UE (e.g., via the TPC bit field in the PDCCH signal from the eNB) to select or apply a specific linear function of $n_{HARQ}$ as a value for the power control parameter $h(n_{CQI}, n_{HARQ})$, so as to enable the UE to more accurately establish transmit power of its PUCCH signal. The present invention also provides exemplary values for the parameter $\Delta_{F\_PUCCH}(F)$ to be used for the PUCCH format 3 in Rel-10.

In one embodiment, the present invention is directed to a method of controlling transmit power of a PUCCH signal to be transmitted by a UE in wireless communication with a processor via a wireless network associated therewith. The method comprises: using the processor, configuring a PUCCH format for the PUCCH signal; and using the processor, instructing the UE to apply only a linear function of $n_{HARQ}$ as a value for $h(n_{CQI}, n_{HARQ})$, wherein $h(n_{CQI}, n_{HARQ})$ is a power control parameter based on the PUCCH format and affecting the transmit power of the PUCCH signal, and wherein $n_{CQI}$, indicates number of Channel Quality Indicator (CQI) bits and $n_{HARQ}$ indicates number of Hybrid Automatic Repeat Request (HARQ) bits in the PUCCH signal.

In another embodiment, the present invention is directed to a mobile communication node configured to provide a radio interface to a mobile handset in a wireless network associated with the mobile handset. The mobile communication node comprises: means for configuring a PUCCH format for a PUCCH signal to be transmitted by the mobile handset; and means for instructing the mobile handset to apply the following linear function of $n_{HARQ}$ as a value for $h(n_{CQI}, n_{HARQ})$:

$$h(n_{CQI}, n_{HARQ}) = \frac{n_{HARQ}}{\alpha} + \beta,$$

wherein "$\alpha$" is an integer constant and $|\beta|<1$, wherein $h(n_{CQI}, n_{HARQ})$ is a power control parameter based on the PUCCH format and affecting the transmit power of the PUCCH signal, and wherein $n_{CQI}$ indicates number of CQI bits and $n_{HARQ}$ indicates number of HARQ bits in the PUCCH signal.

In a further embodiment, the present invention is directed to a system that comprises a mobile handset operable in a wireless network associated therewith; and a mobile communication node configured to provide radio interface to the mobile handset in the wireless network. The mobile communication node in the system is further configured to perform the following: determine a PUCCH format for a PUCCH signal to be transmitted by the mobile handset; and instruct the mobile handset to apply only a linear function of $n_{HARQ}$ as a value for $h(n_{CQI}, n_{HARQ})$, wherein $h(n_{CQI}, n_{HARQ})$ is a power control parameter based on the PUCCH format and affecting the transmit power of the PUCCH signal, and wherein $n_{CQI}$ indicates number of CQI bits and $n_{HARQ}$ indicates number of HARQ bits in the PUCCH signal.

In another embodiment, the present invention is directed to a method that comprises the steps of: using a processor, receiving a power control signal from a mobile communication node to control transmit power of a PUCCH signal; in response to the power control signal, selecting a linear function of $n_{HARQ}$ as a value for $h(n_{CQI}, n_{HARQ})$ using the processor, wherein $h(n_{CQI}, n_{HARQ})$ is a power control parameter affecting the transmit power of the PUCCH signal, and wherein $n_{CQI}$ indicates number of CQI bits and $n_{HARQ}$ indicates number of HARQ bits in the PUCCH signal; and, using the processor, transmitting the PUCCH signal with the linear function applied thereto so as to partially control the transmit power of the PUCCH signal.

In another embodiment, the invention is directed to a UE operable in a wireless network associated therewith. The UE comprises: means for receiving a power control signal from a mobile communication node to control transmit power of a PUCCH signal to be transmitted by the UE, wherein the mobile communication node is configured to provide a radio interface to the UE in the wireless network; and means for applying only a linear function of $n_{HARQ}$ as a value for $h(n_{CQI}, n_{HARQ})$ in response to the power control signal, wherein $h(n_{CQI}, n_{HARQ})$ is a power control parameter affecting the transmit power of the PUCCH signal, and wherein $n_{CQI}$ indicates number of CQI bits and $n_{HARQ}$ indicates number of HARQ bits in the PUCCH signal.

In a further embodiment, the present invention is directed to a method of controlling transmit power of a PUCCH signal to be transmitted by a UE in wireless communication with a processor via a wireless network associated therewith. The PUCCH signal includes a number of CQI bits and a number of HARQ bits. The method comprises the steps of: using the processor, determining whether a PUCCH format for the PUCCH signal uses transmit diversity; and, when the PUCCH format is determined to use transmit diversity, selecting an offset parameter for the PUCCH format using the processor, wherein the offset parameter may or may not affect the value of $h(n_{CQI}, n_{HARQ})$, wherein $h(n_{CQI}, n_{HARQ})$ is a power control parameter based on the PUCCH format and wherein the offset parameter affects the transmit power of the PUCCH signal, and wherein $n_{CQI}$ indicates the number of CQI bits and $n_{HARQ}$ indicates the number of HARQ bits in the PUCCH signal.

In another embodiment, the present invention is directed to a UE operable in a wireless network associated therewith. The UE comprises: means for receiving a PUCCH format for a PUCCH signal to be transmitted by the UE, wherein the PUCCH format uses transmit diversity and wherein the PUCCH signal includes a number of CQI bits and a number of HARQ bits; and means for selecting an offset parameter for the PUCCH format, wherein the offset parameter may or may not affect the value of $h(n_{CQI}, n_{HARQ})$, wherein $h(n_{CQI}, n_{HARQ})$ is a power control parameter based on the PUCCH format and wherein the offset parameter affects the transmit power of the PUCCH signal, and wherein $n_{CQI}$ indicates the number of CQI bits and $n_{HARQ}$ indicates the number of HARQ bits in the PUCCH signal.

In a further embodiment, the present invention is directed to a mobile communication node configured to provide a radio interface to a mobile handset in a wireless network associated with the mobile handset. The mobile communication node comprises: means for determining whether a PUCCH format for a PUCCH signal to be transmitted by the mobile handset uses transmit diversity, the PUCCH signal including a number of CQI bits and a number of HARQ bits; and, when the PUCCH format is determined to use transmit diversity, means for selecting an offset parameter for the PUCCH format, wherein the offset parameter may or may not affect the value of $h(n_{CQI}, n_{HARQ})$, wherein $h(n_{CQI}, n_{HARQ})$ is a power control parameter based on the PUCCH format and wherein the offset parameter affects the transmit power of the PUCCH signal, and wherein $n_{CQI}$ indicates the number of CQI bits and $n_{HARQ}$ indicates the number of HARQ bits in the PUCCH signal.

The linear determination of $h(n_{CQI}, n_{HARQ})$ (and resulting values for $\Delta_{F\_PUCCH}(F)$) according to the teachings of the present invention may provide a more accurate power control for the two PUCCH formats in Rel-10—i.e., PUCCH format 3 and channel selection—compared to if the same method as for PUCCH format 2 (i.e., logarithmic determination) is adopted. More accurate power control may lead to less inter-cell interference and high multiplexing capability on PUCCH, and therefore also higher system throughput (i.e., data throughput in downlink for a UE) on PDSCH (Physical Downlink Shared Channel).

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. Additionally, it should be understood that although the invention is described primarily in the context of a cellular telephone/data network, the invention can be implemented in other forms of wireless networks as well (for example, a corporate-wide wireless data network, a satellite communication network, and the like).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form.

It is noted at the outset that the terms "coupled," "connected", "connecting," "electrically connected," etc., are used interchangeably herein to generally refer to the condition of being electrically connected. Similarly, a first entity is considered to be in "communication" with a second entity (or entities) when the first entity electrically sends and/or receives (whether through wireline or wireless means) information signals (whether containing voice information or non-voice data/control information) to the second entity regardless of the type (analog or digital) of those signals. It is further noted that various figures (including component diagrams, graphs, or charts) shown and discussed herein are for illustrative purpose only, and are not drawn to scale.

Figure 1:
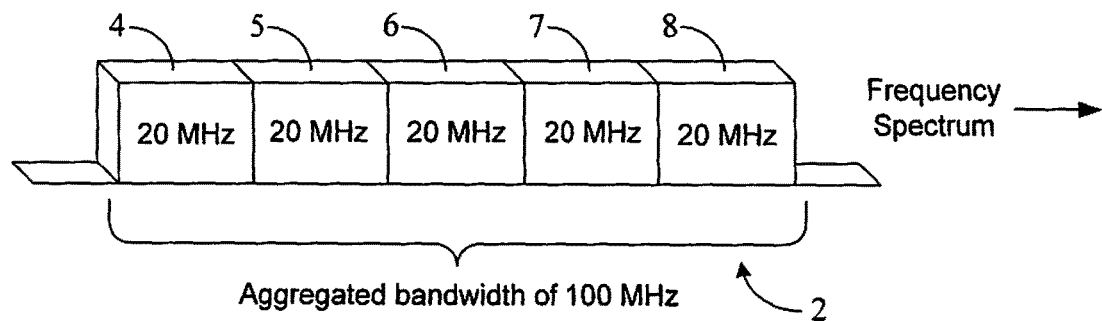
FIG. 1 illustrates the principle of Component Carrier (CC) aggregation.
Figure 2:
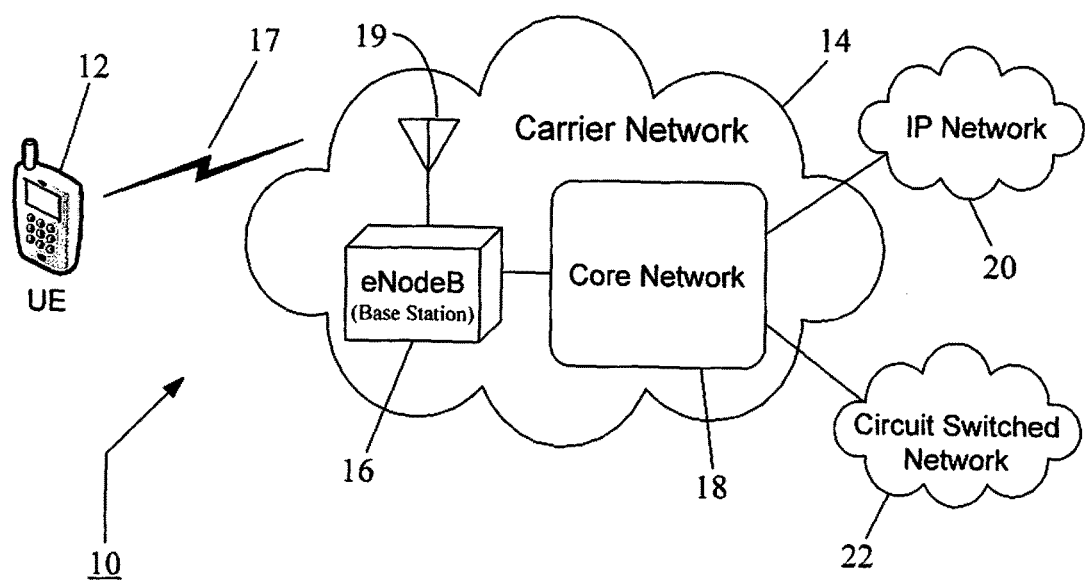
FIG. 2 is a diagram of an exemplary wireless system in which PUCCH power control according to the teachings of one embodiment of the present invention may be implemented.

FIG. 2 is a diagram of an exemplary wireless system 10 in which PUCCH power control according to the teachings of one embodiment of the present invention may be implemented. The system 10 may include a mobile handset 12 that is in wireless communication with a carrier network 14 of a wireless service provider through a communication node 16 of the carrier network 14. The communication node 16 may be, for example, a base station in a 3G network or an evolved Node-B (eNodeB) when the carrier network is a Long-Term Evolution (LTE) network, and may provide radio interface to the mobile handset 12. In other embodiments, the communication node 16 may also include a site controller, an access point (AP), or any other type of radio interface device capable of operating in a wireless environment. It is noted here that the terms "mobile handset," "wireless handset," and "user equipment (UE)" may be used interchangeably herein to refer to a wireless communication device that is capable of voice and/or data communication via a wireless carrier network. Some examples of such mobile handsets include cellular telephones or data transfer equipments (e.g., a Personal Digital Assistant (PDA) or a pager), smartphones (e.g., iPhone™, Android™, Blackberry™, etc.), computers, or any other type of user devices capable of operating in a wireless environment. Similarly, the terms "wireless network" or "carrier network" may be used interchangeably herein to refer to a wireless communication network (e.g., a cellular network) facilitating voice and/or data communication between two user equipments (UE's).

In addition to providing air interface (e.g., as represented by a wireless link 17 in FIG. 2) to the UE 12 via an antenna 19, the communication node 16 may also perform radio resource management (as, for example, in case of an eNodeB in an LTE system) such as, for example, via Carrier Aggregation (CA) (e.g., aggregation of up to five carriers each having a bandwidth of up to 20 MHz) mentioned hereinbefore. In case of a 3G carrier network 14, the communication node 16 may include functionalities of a 3G base station along with some or all functionalities of a 3G Radio Network Controller (RNC) to perform the PUCCH power control discussed hereinbelow. Communication nodes in other types of carrier networks (e.g., 4G networks and beyond) also may be configured similarly. In one embodiment, the node 16 may be configured (in hardware, via software, or both) to implement the PUCCH power control as discussed herein. For example, when existing hardware architecture of the communication node 16 cannot be modified, the PUCCH power control methodology according to one embodiment of the present invention may be implemented through suitable programming of one or more processors (e.g., processor 95 (or, more particularly, processing unit 99) in FIG. 13) in the communication node 16. The execution of the program code (by a processor in the node 16) may cause the processor to perform PUCCH power control as discussed herein. Thus, in the discussion below, although the communication node 16 may be referred to as "performing," "accomplishing," or "carrying out" a function or process, it is evident to one skilled in the art that such performance may be technically accomplished in hardware and/or software as desired. Similarly, the UE 12 may be suitably configured (in hardware and/or software) to perform its portion of PUCCH power control as discussed in more detail hereinbelow.

The carrier network 14 may include a core network 18 coupled to the communication node 16 and providing logical and control functions (e.g., subscriber account management, billing, subscriber mobility management, etc.) in the network 18. In case of an LTE carrier network, the core network 18 may be an Access Gateway (AGW). Regardless of the type of carrier network 14, the core network 18 may function to provide connection of the UE 12 to other mobile handsets operating in the carrier network 14 and also to other communication devices (e.g., wireline phones) or resources (e.g., an Internet website) in other voice and/or data networks external to the carrier network 14. In that regard, the core network 18 may be coupled to a packet-switched network 20 (e.g., an Internet Protocol (IP) network such as the Internet) as well as a circuit-switched network 22 such as the Public-Switched Telephone Network (PSTN) to accomplish the desired connections beyond the devices operating in the carrier network 14. Thus, through the communication node's 16 connection to the core network 18 and the handset's 12 radio link with the communication node 16, a user of the handset 12 may wirelessly (and seamlessly) access many different resources or systems beyond those operating within the carrier network 14 of an operator.

As is understood, the carrier network 14 may be a cellular telephone network in which the UE 12 may be a subscriber unit. However, as mentioned before, the present invention is operable in other non-cellular wireless networks as well (whether voice networks, data networks, or both). Furthermore, portions of the carrier network 14 may include, independently or in combination, any of the present or future wireline or wireless communication networks such as, for example, the PSTN, or a satellite-based communication link. Similarly, as also mentioned above, the carrier network 14 may be connected to the Internet via its core network's 18 connection to the IP (packet-switched) network 20 or may include a portion of the Internet as part thereof.

Whether Carrier Aggregation (CA) is present or not, during initial access, an LTE Rel-10 terminal (or UE) may behave similar to an LTE Rel-8 terminal. Upon successful connection to the network, the terminal may—depending on its own capabilities and the network—be configured with additional CCs in the UL and DL. This configuration may be based on Radio Resource Control (RRC) signaling. However, due to the heavy signaling and rather slow speed of RRC signaling, a terminal may be initially configured (by the eNB 16) with multiple CCs even though not all of them are currently used. If the terminal/UE 12 is configured on multiple CCs, the terminal may have to monitor all configured DL CCs for PDCCH and Physical Downlink Shared Channel (PDSCH). This may require a wider bandwidth, higher sampling rates, etc., which may result in high power consumption at the UE 12.

To mitigate above problems with configurations on multiple CCs, LTE Rel-10 also supports activation of CCs (on top of the configuration of CCs mentioned above) by the eNB 16. In one embodiment, the terminal or UE 12 monitors only configured and activated CCs for PDCCH and PDSCH. In one embodiment, activation may be based on Media Access Control (MAC) control elements, which may be faster than RRC signaling. The MAC-based activation/de-activation can follow the number of CCs that is required to fulfill the current data rate needs. Upon arrival of large data amounts, multiple CCs are activated (e.g., by eNB 16), used for data transmission, and de-activated if not needed anymore. All but one CC—the DL Primary CC (DL PCC)—can be de-activated. Activation therefore provides the possibility to configure multiple CCs but only activate them on as-needed basis. Most of the time, a terminal or UE 12 would have one or very few CCs activated, resulting in a lower reception bandwidth and thus reduced battery consumption.

However, if MAC signaling (and, especially, the HARQ feedback signaling (by the UE 12) indicating if the activation command has been received successfully) produces errors, then, in one embodiment, the CA PUCCH format may be based on the number of configured CCs. Thus, in case of more than one CC configured for the UE 12, the CA PUCCH format of Rel-10 may be selected for that UE 12 by the eNB 16 and communicated to the UE 12 via a downlink control signal (e.g., the PDCCH signal). On the other hand, in case of configuration of a single CC for the UE 12, a PUCCH format of Rel-8 may be selected.

From a UE perspective, both symmetric and asymmetric uplink/downlink (UL/DL) CC configurations may be supported. When the UE 12 is configured with a single DL CC (which is then the DL PCC) and UL CC (which is then the UL PCC), the eNB 16 may instruct the UE 12 to operate dynamic ACK/NACK on PUCCH according to Rel-8. The first Control Channel Element (CCE) used to transmit PDCCH for the DL assignment determines the dynamic ACK/NACK resource on Rel-8 PUCCH. If only one DL CC is cell-specifically linked with the UL PCC, no PUCCH collisions may occur since all PDCCH are transmitted using different first CCE.

In cell asymmetric CA scenario or for other reasons, multiple DL CCs may cell-specifically linked with the same UL CC. Terminals configured with same UL CC but with different DL CC (i.e., with any of the DL CCs that are cell-specifically linked with the UL CC) share the same UL PCC but have different DL PCCs. Terminals receiving their DL assignments from different DL CCs may transmit their HARQ feedback on the same UL CC. It is up to eNB scheduler (not shown in FIG. 2, but shown in FIG. 13) to ensure that no PUCCH collisions occur. However, at least in Rel-10, a terminal may not be configured with more UL CC than DL CC.

In one embodiment, when the UE 12 has multiple DL CCs configured therefor (by the eNB 16), each PDCCH transmitted on the DL PCC has a Rel-8 PUCCH resource reserved on the UL PCC. Even though a terminal is configured with multiple DL CCs, but only receives a DL PCC assignment, it may still use the Rel-8 PUCCH resource on UL PCC. An alternative embodiment may use, even for a single DL PCC assignment, the CA PUCCH that enables feedback of HARQ bits corresponding to the number of configured CCs—even though only the DL PCC is active and used. In another embodiment, upon reception of DL assignments on a single Secondary CC (SCC) or reception of multiple DL assignments, CA PUCCH may be used since CA PUCCH may support feedback of HARQ bits of multiple CCs.

Power control for PUCCH is described in section 5.1.2.1 in Release 10 of 3GPP TS 36.213 (mentioned hereinbefore). The disclosure of that section is incorporated herein by reference in its entirety. As is known, the power control for PUCCH contains a general part for all PUCCH formats and specific parameters that are based on the payload on PUCCH. The specific part primarily contains the two parameters $\Delta_{F\_PUCCH}(F)$ and $h(n_{CQI}, n_{HARQ})$—The parameter $\Delta_{F\_PUCCH}(F)$ defines the relative performance difference between PUCCH format 1a and the currently-used PUCCH format (for the UE 12). For PUCCH format 3 in Rel-10, 3 to 4 different values (as discussed below) may be determined for this relative offset. These values may cover potential different eNB receiver implementations. The parameter $h(n_{CQI}, n_{HARQ})$, on the other hand, adapts the PUCCH transmit power (at the UE 12) to the number of bits that are transmitted in the PUCCH signal from the UE 12. As given in the "Background" section above, for PUCCH 1a/1b, the value of $h(n_{CQI}, n_{HARQ})$ is 0 dB, since these formats only support one/fixed payload size (1 or 2-bit ACK/NACK) for the format. PUCCH format 3 in Rel-10 is however similar to PUCCH format 2 in Rel-8 in that it supports different (variable) payload sizes. It is therefore desirable that the power control be adaptable based on the number of ACK/NACK bits that are transmitted with PUCCH format 3.

Figure 3:
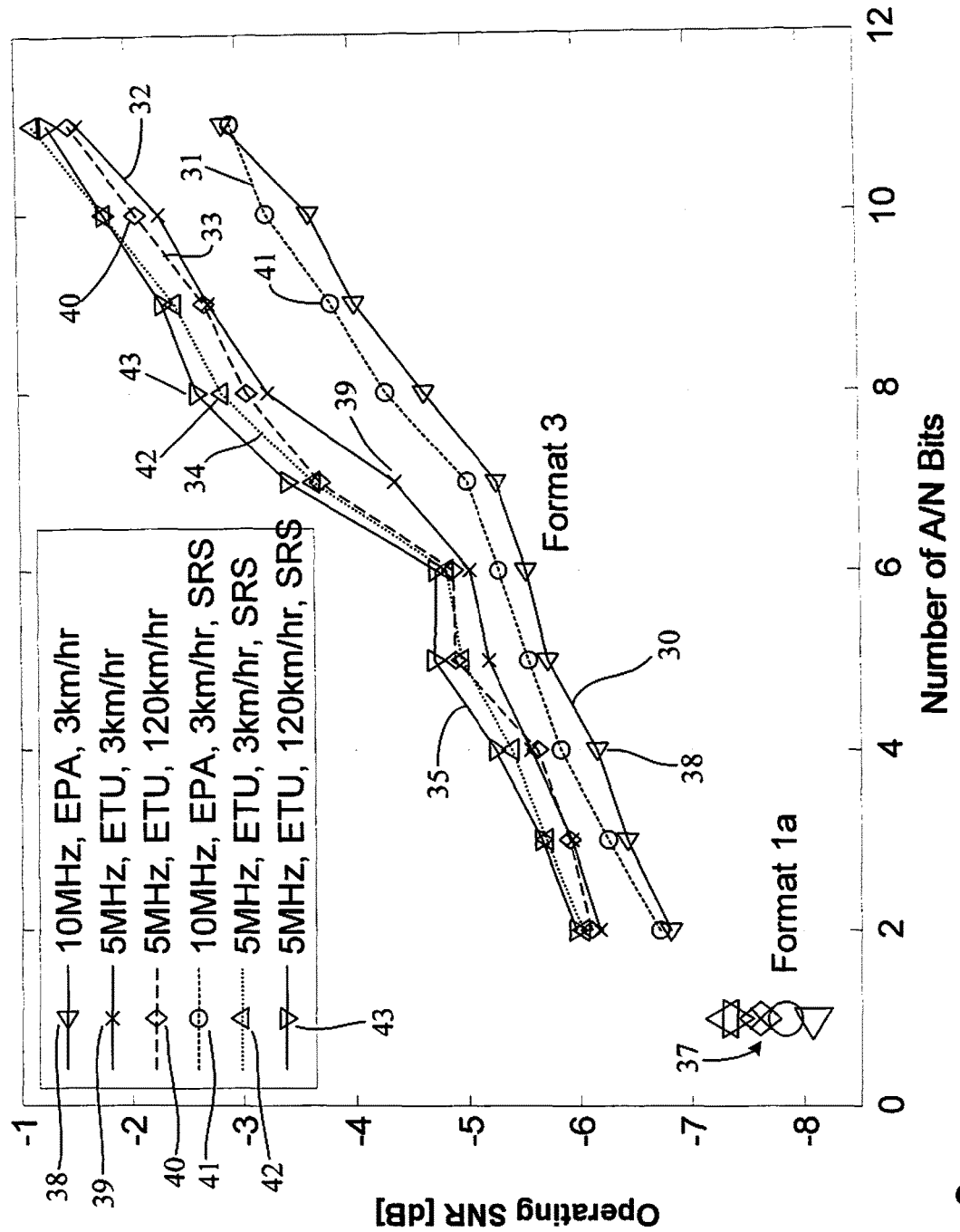
FIG. 3 illustrates graphs depicting operating Signal-to-Noise Ratios (SNRs) for PUCCH format 3 under different channel model assumptions.

FIG. 3 illustrates graphs 30-35 depicting operating SNRs (Signal-to-Noise Ratio) for PUCCH format 3 under different channel model assumptions. The values of operating SNRs for PUCCH format 1a (1-bit ACK/NACK) for the assumed channel models are also shown as a reference and identified by the reference numeral "37." For ease of illustration, each geometrical symbol 38-43 depicted for the SNR values for format 1a is not identified individually in FIG. 3, but collectively identified through reference numeral "37". However, each of the geometrical symbols 38-43 is identified in the legend section of FIG. 3 and also marked on the corresponding graph 30-35. It is noted here that the plots 30-35 and 37 are simulation results of PUCCH signals received at an eNB (e.g., the eNB 16) under six different assumed radio channel types (i.e., pedestrian or vehicular channels) and velocities (of UE's in the corresponding channel type): (i) an Enhanced Pedestrian Channel (EPA) having 10 MHz bandwidth and 3 km/hr UE velocity (i.e., the velocity of the UE when the UE is carried by a pedestrian) (identified by a sideways triangle 38); (ii) an Enhanced Typical Urban (ETU) channel having 5 MHz bandwidth and 3 km/hr UE velocity (identified by an "x" mark 39); (iii) a 5 MHz ETU channel with 120 km/hr UE velocity (i.e., the velocity of the UE when the UE is carried by a vehicle) (identified by a diamond shape 40); (iv) a 10 MHz EPA channel with 3 km/hr UE velocity and presence of an additional uplink signal—the Sounding Reference Signal (SRS)—from the UE to the eNB (identified by a circle 41); (v) a 5 MHz ETU channel with 3 km/hr UE velocity and presence of an SRS signal (identified by an upward triangle 42); and (a 5 MHz ETU channel with 120 km/hr UE velocity and presence of an SRS signal (identified by a downward triangle 43).

It is noted here that an SRS signal may be sent by an UE (e.g., the UE 12) to an eNB (e.g., the eNB 16). The UE may use the SRS signal to allow the eNB to provide channel-dependent (i.e., frequency selective) uplink scheduling. In response to the SRS signal from the UE, the eNB may provide the requested scheduling information via PDCCH/PDSCH signaling from the eNB. The SRS signal may be sent independently of the PUCCH signal.

It is observed from FIG. 3 that the shortened PUCCH format 3 (which is limited to a maximum of 11 ACK/NACK bits as opposed to 21 ACK/NACK bits in FIG. 4 discussed below) may cause small SNR offsets for each additional payload (ACK/NACK) bit. With average offset size less than 0.3 dB, an additional PUCCH power control term (e.g., in the context of equation (1)) accounting for SRS subframes explicitly may not be warranted in PUCCH format 3 signals.

Figure 4:
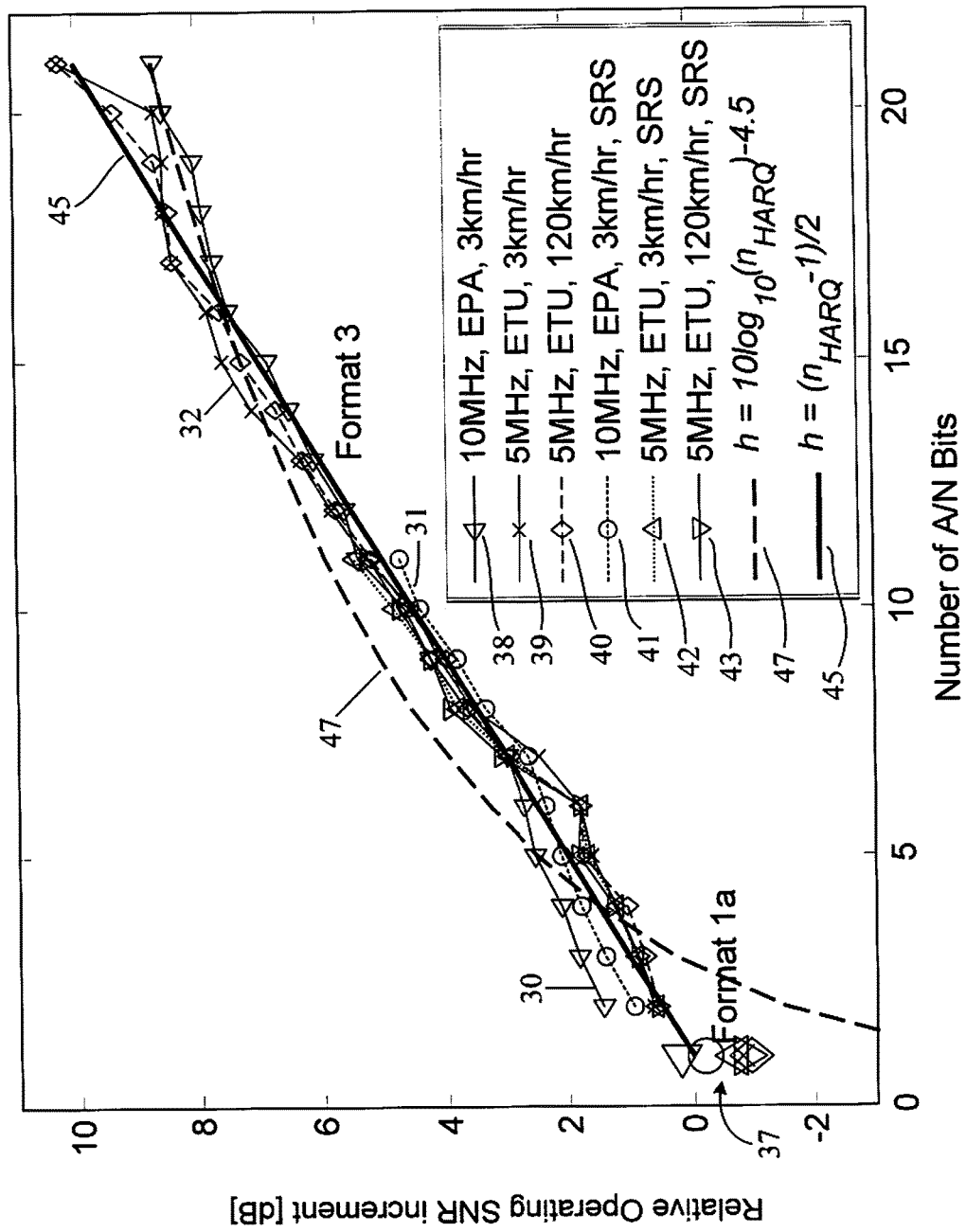
FIG. 4 depicts relative operating SNR increments for PUCCH format 3 under different channel model assumptions shown in FIG. 3.

FIG. 4 depicts relative operating SNR increments for PUCCH format 3 under different channel model assumptions shown in FIG. 3. To be able to determine $\Delta_{F\_PUCCH}(F)$ and the correct function of $h(n_{CQI}, n_{HARQ})$ for PUCCH format 3 in Rel-10, it is assumed in the context of FIG. 4 that an eNB (e.g., the eNB under simulation, or the eNB 16 in a real life implementation) can correctly control the power of PUCCH format 1a. With that assumption, it is desirable to fit a curve/plot that matches the slope of all the different plots 30-35 in FIG. 3 so as to determine a value for $h(n_{CQI}, n_{HARQ})$ in the embodiments of FIGS. 3-4. Determining $\Delta_{F\_PUCCH}(F)$ may be done in the same process by calculating the difference between PUCCH format 1a and the corresponding PUCCH format 3 graphs for each channel type and velocity.

To construct FIG. 4, each plot 30-35 in FIG. 3 (including the PUCCH format 1a results 37) has been arbitrary moved so that all the plots lay on top of each other. This process thus enables one to find the slope of all the plots when fitted together, thereby determining $h(n_{CQI}, n_{HARQ})$. Based on the determination of $h(n_{CQI}, n_{HARQ})$, it is then also possible to determine the corresponding $\Delta_{F\_PUCCH}(F)$ for each channel scenario. Furthermore, in FIGS. 3 and 4, the simulated receiver (e.g., eNB or other base station) may employ suitable DTX (Discontinuous Transmission) detection algorithm. As is known, with discontinuous transmission, communication between an eNB and UE over a channel does not occur continuously, but may be cycled on and off as per data transmission requirements. Thus, a DTX-capable channel may not be continuously active.

It is noted here that, for ease of illustration and clarity, each graph from FIG. 3 appearing in FIG. 4 has not been identified individually. Similarly, in other figures (i.e., FIGS.

5-11) discussed herein, when clarity is needed, detailed identification of various graphs through reference numerals is avoided. Furthermore, for ease of discussion, the reference numerals 38-43 and corresponding geometrical symbols associated with different channel models are used consistently throughout FIGS. 3-6 presented herein. Similarly, reference numerals 64-66 and corresponding geometrical symbols associated with different channel models are used consistently throughout FIGS. 7-11 discussed below.

In FIG. 4, the ACK/NACK (also referred to as "A/N") bit range is expanded (to up to 21 bits) to cover the previously provided simulation results (in FIG. 3) for PUCCH format 3 under different channel model assumptions. In FIG. 4, plot 45 fits reasonably well over other plots (i.e., shifted versions of plots 30-35 from FIG. 3). It is observed from plot 45 that the following formula may fit the SNR increments very well for the plots 30-35 in FIGS. 3-4:

$$h(n_{CQI}, n_{HARQ}) = \frac{n_{HARQ} - 1}{2} \quad (2)$$

Furthermore, from the relative positions of PUCCH format 3 and format 1a plots, it is observed that two of the values for $\Delta_{F\_PUCCH}(F)$ may be 0 and 1 dB. To give some extra implementation margin, an additional value for $\Delta_{F\_PUCCH}(F)$ may be 2 dB. The fourth value for $\Delta_{F\_PUCCH}(F)$ may be left as spare (for implementation-specific determination) and can be utilized in case real-life SNR evaluation results indicate that there is need to expand the value range of $\Delta_{F\_PUCCH}(F)$. It is noted here that, in one embodiment, RRC signaling may have 2 bits allocated to convey a value of $\Delta_{F\_PUCCH}(F)$ for a specific PUCCH format, thereby allowing four (4) different values to be specified for $\Delta_{F\_PUCCH}(F)$. In an alternative embodiment, any length of values ($\geq 0$) may be specified for $\Delta_{F\_PUCCH}(F)$ depending, for example, on the number of bits reserved for $\Delta_{F\_PUCCH}(F)$ in a radio signaling protocol.

As mentioned before, it has been proposed for the PUCCH format 3 in Rel-10 to apply $h(n_{CQI}, n_{HARQ}) = 10 \log_{10}(n_{HARQ})$. FIG. 4 also shows a plot 47 for this log-based formula (which is slightly modified by deducting 4.5 dB to provide the closest approximation to graphs 30-35 in FIG. 4) for $h(n_{CQI}, n_{HARQ})$. It is seen from the plot 47 that the proposed log-based formula for $h(n_{CQI}, n_{HARQ})$ does not appear to fit the data as well as the linear determination provided in equation (2) above.

Thus, in one embodiment, for PUCCH format 3, the parameter $\Delta_{F\_PUCCH}(F)$ may consist of the values {0 dB, 1 dB, 2 dB, spare}, and $$h(n_{CQI}, n_{HARQ}) = \frac{n_{HARQ} - 1}{2}.$$

Thus, the values for $\Delta_{F\_PUCCH}(F)$ according to one embodiment of the present invention provide sufficient implementation-related margin and cover different receiver (i.e., eNB or other base station) implementations. Furthermore, the values for $\Delta_{F\_PUCCH}(F)$ also cover different operation scenarios an eNB (e.g., the eNB 16) may be deployed in (e.g., if the radio environment around the eNB creates a very dispersive channel, etc.). In one embodiment, the value for the parameter $h(n_{CQI}, n_{HARQ})$ may be more generally expressed as:

$$h(n_{CQI}, n_{HARQ}) = \frac{n_{HARQ}}{\alpha} + \beta \quad (3)$$

In the equation (3) above, "$\alpha$" is an integer constant and $|\beta| < 1$. The value of "$\beta$" could either be included in the $h(n_{CQI}, n_{HARQ})$ (as in case of equation (3) above) or it could be included in $\Delta_{F\_PUCCH}(F)$. In the context of equation (2), $\alpha = 2$ and $\beta = -\frac{1}{2}$. However, other values for $\alpha$ and $\beta$ may be possible in other embodiments. For example, in the embodiment of FIG. 11 discussed below, $\alpha = 3$ and $\beta = -\frac{1}{3}$.

Thus, according to one embodiment of the present invention, the eNB 16 may initially configure a PUCCH format for the UE 12. In case of carrier aggregation (CA), the eNB 16 may specify a CA PUCCH format such as PUCCH format 3 or channel selection. Based on the CA PUCCH format, the eNB 16 may instruct the UE 12 to apply only a linear function of $n_{HARQ}$ (as given, for example, by equations (2) and (3) above) as a value for $h(n_{CQI}, n_{HARQ})$ to control the transmit power of the PUCCH signal to be transmitted by the UE 12. In one embodiment, appropriate linear functions for $h(n_{CQI}, n_{HARQ})$ may be stored in a memory (shown in FIG. 12) in the UE 12. These functions may address channel conditions, whether transmit diversity is used or not (as discussed below), etc. The eNB 16 may specify (e.g., via an indication (e.g., a specific value or combination of bits) through a TPC command in a DCI message on PDCCH) to the UE 12 which of those stored functions to apply for power control. Similarly, UE 12 may also store a set of values for $\Delta_{F\_PUCCH}(F)$ as per the teachings of the present invention. The eNB 16 may also specify (e.g., via the TPC command) which value for $\Delta_{F\_PUCCH}(F)$ may be used by a specific UE 12 based on the existing channel conditions and PUCCH format. The UE 12 may be configured to select the eNB-specific values for various uplink power control parameters.

It is here observed that, because all TPC commands address the same UL CC and/or PUCCH reference, in one embodiment, it may be desirable to only transmit the true TPC command in one TPC field and reuse TPC fields in other DCI messages for non-power control related information. Doing this may enable higher data rates for non-redundant control information.

Referring now to equation (2), if PUCCH format 3 is used for CA ACK/NACK, in one embodiment, $n_{HARQ}$ in equation (2) can be based on one or more of the following: (i) the number of ACK/NACK bits (in the PUCCH signal to be transmitted by the UE 12) that corresponds to the number of configured component carriers and configured transmission modes on the configured CCs; (ii) the number of ACK/NACK bits that corresponds to the number of activated component carriers and configured transmission modes on the activated CCs; and (iii) the number of ACK/NACK bits that corresponds to the number of transport blocks received at the UE 12 (e.g., the number of ACK/NACK bits actually to be transmitted by the UE 12 for the received transport blocks). The transmission modes may include various Multiple Input Multiple Output (MIMO) UL/DL transmission modes in LTE.

It is observed here that it may be very seldom that a UE is not scheduled on all resources that it can receive. In other words, if the UE is activated on multiple component carriers and it is scheduled, then the UE is in most times scheduled on all its activated component carriers. To avoid a situation in which the UE transmits with too low power, in one embodiment, it may be desirable that the UE set its power on PUCCH format 3 based on the number of activated component carriers.

However, if the eNB and UE have different understanding about the number of activated component carriers, in one embodiment, the value of $n_{HARQ}$ for PUCCH format 3 may be based on the number of configured CCs and not on the number of activated component carrier. There are mainly two aspects here: (i) NACK→ACK or ACK→NACK error in the MAC (de-)activation message in case a component carrier is activated or deactivated, and (ii) the case with autonomous deactivation of component carriers by UE. Autonomous deactivation was introduced in case the eNB "forgets" to deactivate component carriers. Thus, autonomous deactivation situation could therefore be avoided at the eNB level by appropriate eNB implementation. However, the NACK→ACK or ACK→NACK errors may still occur in some situations, but the impact of them may be small if they only affect the power control compared to the coding part because, for the power control, the eNB could compensate by transmitting some additional TPC commands. Further, if the power control is based on the number of activated component carriers together with the configured transmission modes on these component carriers, the transmitted power of the UE may in most cases correspond to the number of scheduled component carriers.

On the other hand, if PUCCH format 3 is used for non-CA ACK/NACK, $n_{HARQ}$ in equation (2) above can be based on one or more of the following: (i) the number of ACK/NACK bits that corresponds to the maximum number of possible scheduled DL transport blocks corresponding to utilized UL/DL subframe configuration and configured transmission modes for the UE 12; (ii) the number of ACK/NACK bits that corresponds to the maximum number of possible scheduled DL transport blocks within the feedback window of the UL subframe where the PUCCH format 3 is transmitted; and (iii) the number of ACK/NACK bits that corresponds to the number of transport blocks received at the UE 12. In one embodiment, data (to be sent to the eNB 16) may arrive at a coding unit (not shown) in the UE 12 in the form of a maximum of one transport block per Transmit Time Interval (TTI) (which can be equal to a frame duration of 1 ms). In all the three above cases, spatial bundling may be performed so that one ACK/NACK bit is at maximum generated per associated DL subframe.

It is noted here that although $n_{HARQ}$ in equations (2) and (3) may be generally determined in terms of the number of ACK/NACK bits, in certain embodiments, scheduling requests (SR) could also be taken into account in the same manner as ACK/NACK bits in determining the value of $n_{HARQ}$. Thus, in some embodiments, the parameter $n_{HARQ}$ may correspond to only the number of ACK/NACK bits, but, in other embodiments where SR is jointly transmitted together with the ACK/NACK, $n_{HARQ}$ may also account for SRs as well (i.e., in addition to A/N bits). Furthermore, in some other embodiments, the number of ACK/NACK bits for the value of $n_{HARQ}$ may also take into account any Semi-Persistent Scheduling (SPS) deactivation message from the UE 12.

Figure 5:
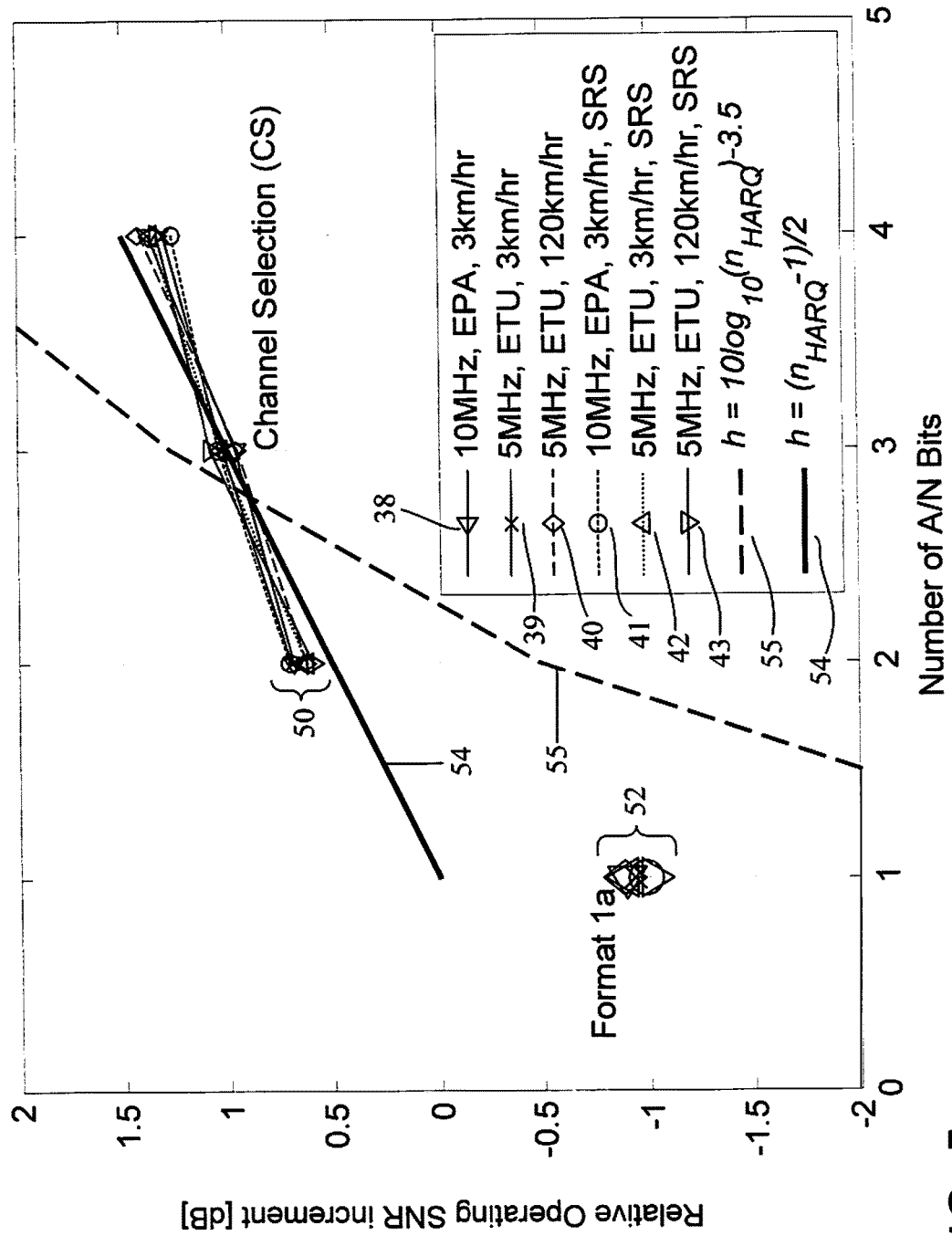
FIG. 5 shows that the same linear function for $h(n_{CQI}, n_{HARQ})$ disclosed with reference to FIG. 4 can be used to power control channel selection based HARQ feedback schemes.

FIG. 5 shows that the same linear function for $h(n_{CQI}, n_{HARQ})$ disclosed with reference to FIG. 4 can be used to power control channel selection (CS) based HARQ feedback schemes, such as those described by 3GPP Contribution Document No. R1-105807, "Way forward on A/N mapping table for channel selection, Nokia Siemens Networks" (referred to herein as "R1-105807"), which is incorporated by reference herein in its entirety. As mentioned before, CA PUCCH in Rel-10 can be done in two different ways: (i) the use of PUCCH format 3 (discussed hereinbefore with reference to FIGS. 3-4), or (ii) Channel Selection (CS). The basic principle of the second CA PUCCH method—i.e., channel selection—is that the UE is assigned a set of PUCCH format 1a/1b resources by the eNB. The UE then selects one of the assigned resources according to the ACK/NACK sequence (which may include DTX detection bits) the UE should transmit. Once the resource is selected, the UE would then transmit the ACK/NACK sequence using a Quadrature Phase Shift Keying (QPSK) signal or a Binary Phase Shift Keying (BPSK) signal. The eNB detects which resource the UE uses and which QPSK or BPSK value the UE fed back on the used resource, and combines this detection into an HARQ response for associated DL cells. Thus, the number of A/N bits in the channel selection method of CA PUCCH may range from 2 to 4 bits as illustrated on the x-axis in FIG. 5.

In FIG. 5, similar to FIG. 4, various individual SNR plot simulations are combined to obtain relative operating SNR increments. For the sake of clarity and ease of illustration, these plots are collectively identified by the reference numeral "50." Similarly, data points for PUCCH format 1a are also shown as a reference and identified by numeral "52." As in case of FIG. 4, the value of $$h(n_{CQI}, n_{HARQ}) = \frac{n_{HARQ} - 1}{2}$$

(equation (2) above) fits reasonably well in the embodiment of FIG. 5 as can be seen by the plot 54. FIG. 5 also shows a plot 55 for the proposed log-based formula for $h(n_{CQI}, n_{HARQ})$ (which is slightly modified by deducting 3.5 dB to provide the closest approximation to graphs 50 in FIG. 5). Again, similar to the case in FIG. 4, it is seen from the plot 55 that the proposed log-based formula for $h(n_{CQI}, n_{HARQ})$ does not appear to fit the data as well as the linear determination provided in equation (2) above.

Figure 6:
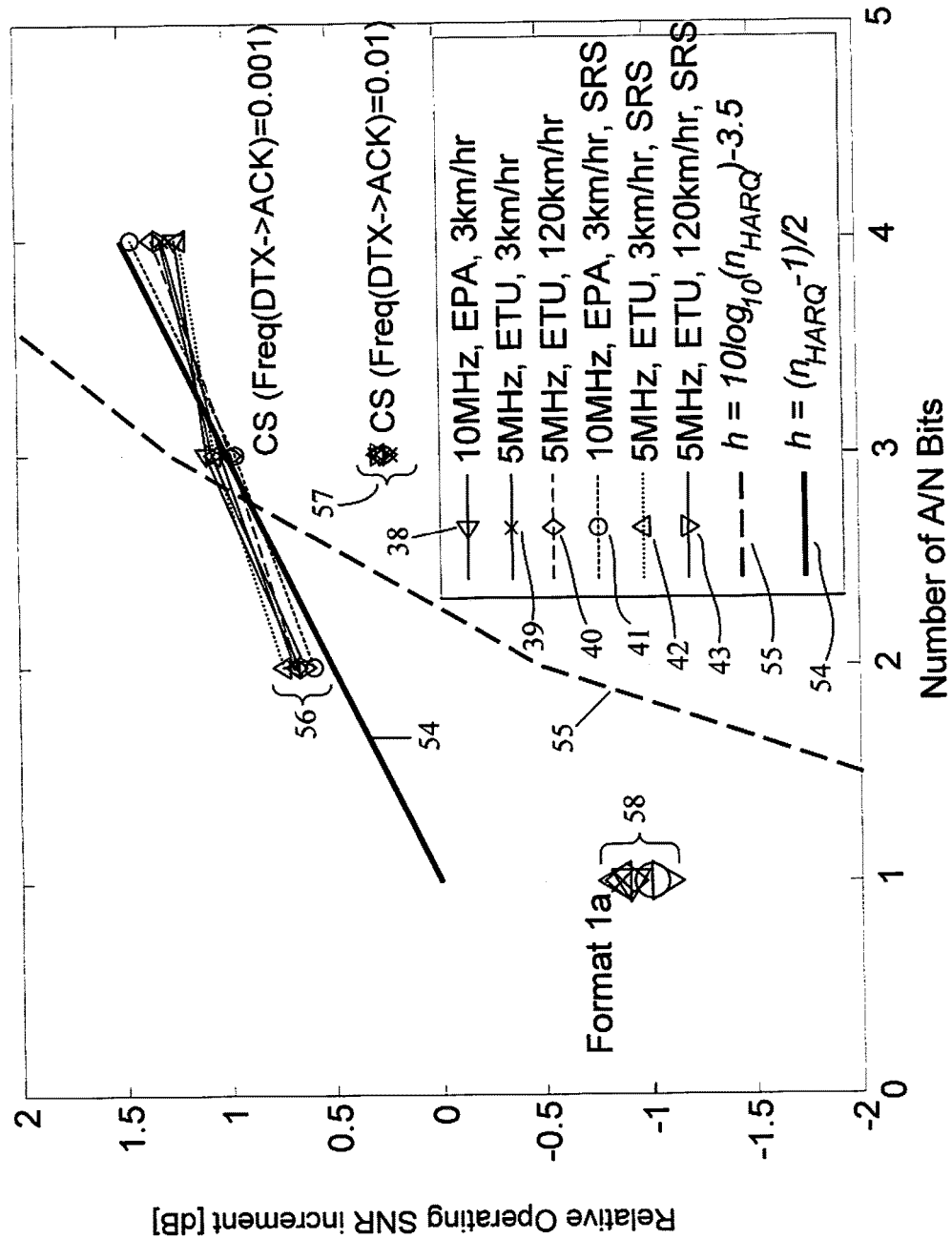
FIG. 6 shows relative operating SNR plots for two channel selection feedback designs having different DTX detection thresholds.

FIG. 6 shows relative operating SNR plots 56-57 for two channel selection feedback designs having different DTX detection thresholds. For alternative channel selection feedback designs, such as that provided in 3GPP Submission Document No. R1-105476, "Mapping Tables for Format 1b with Channel Selection" (referred to herein as "R1-105476"), which is incorporated herein by reference in its entirety, the DTX detection threshold of the receiver (i.e., eNB or other BS) can be set non-uniformly for the range of HARQ feedback bits (which may range from 2 to 4 A/N bits as mentioned before). More specifically, two cases are considered in the following with reference to the simulated plots 56-57 in FIG. 6. (The data points 58 for PUCCH format 1a are also provided as reference.)

(1) The DTX detection threshold of a receiver (e.g., the eNB 16) can be uniformly set to achieve, for instance, Freq(PUCCH DTX→ACK bits)≤$10^{-3}$. The plots 56 FIG. 6 and plots 50 in FIG. 5 represent the CS case in which Freq(DTX→ACK)=0.001. As in case of the plots 50 in FIG. 5, the same linear function $h(n_{CQI}, n_{HARQ})$ (indicated by plot 54) can be used for plots 56 to power control this channel-selection-based HARQ feedback scheme with uniform DTX detection threshold setting. The reason for the more stringent DTX detection threshold is that some NACK values are mapped to DTX and the likelihood that Pr(NACK→ACK)≤$10^{-3}$.

(2) For the special case of 3 A/N feedback bits, the design of R1-105476 provides the flexibility to alternatively set the DTX detection threshold to Freq(PUCCH DTX→ACK bits)≤$10^{-2}$ since no NACK events are mapped to DTX. Because of this looser detection requirement, the operating SNR is improved by around 0.75 dB (as seen from the plots 57 for A/N=3 bits) when compared to the normal DTX detection settings (i.e., corresponding data points in plots 56 for A/N=3 bits). This SNR offset can be addressed in two ways: (a) In one embodiment, the 0.75 dB operating SNR offset can be compensated by the carrier network through the TPC command $\delta_{PUCCH}$ from an eNB (e.g., the eNB 16). Thus, the eNB may be configured to provide this SNR offset as part of its PUCCH power control. (b) In another embodiment, an additional automatic adjustment term of, e.g., −0.75 dB (or −1 dB), can be inserted into the values of $h(n_{CQI}, n_{HARQ})$ (e.g., equation (3) given hereinbefore) or $\Delta_{F\_PUCCH}(F)$ function discussed earlier. In one embodiment, an implementation-based solution may be used to resolve this type of SNR offset case by TPC command in the eNB.

Thus, it is seen from the simulation results in FIG. 5 (in which the HARQ feedback scheme is based on channel selection table provided in R1-105807) and FIG. 6 (in which HARQ feedback scheme is based on channel selection table provided in R1-105476) that the linear function of $h(n_{CQI}, n_{HARQ})$ (e.g., as provided in equation (2)) provides better power control values for CS-based CA PUCCH than the proposed logarithmic function. As mentioned before, in one embodiment, receiver (eNB) DTX detection for 2 or 4 HARQ bits may be based on Freq(PUCCH DTX→ACK bits)≤$10^{-3}$, whereas, for 3 HARQ bit feedback, receiver DTX detection can be based on either Freq(PUCCH DTX→ACK bits)≤$10^{-3}$ or Freq(PUCCH DTX→ACK bits)≤$10^{-2}$.

In one embodiment, a transmit diversity scheme may be used for PUCCH Format 3. An example of such transmit diversity scheme is Spatial Orthogonal-Resource Transmit Diversity (SORTD), where the same information is transmitted by eNB on each antenna port (not shown) using an orthogonal resource. Other potential transmit diversity schemes include Alamouti (time and frequency based transmit diversity) and frequency-switched transmit diversity. As discussed with reference to FIGS. 7 through 11, the linear determination of the PUCCH power control parameter $h(n_{CQI}, n_{HARQ})$ according to the teachings of the present invention may be equally used in case of PUCCH format 3 with transmit diversity.

Figure 7:
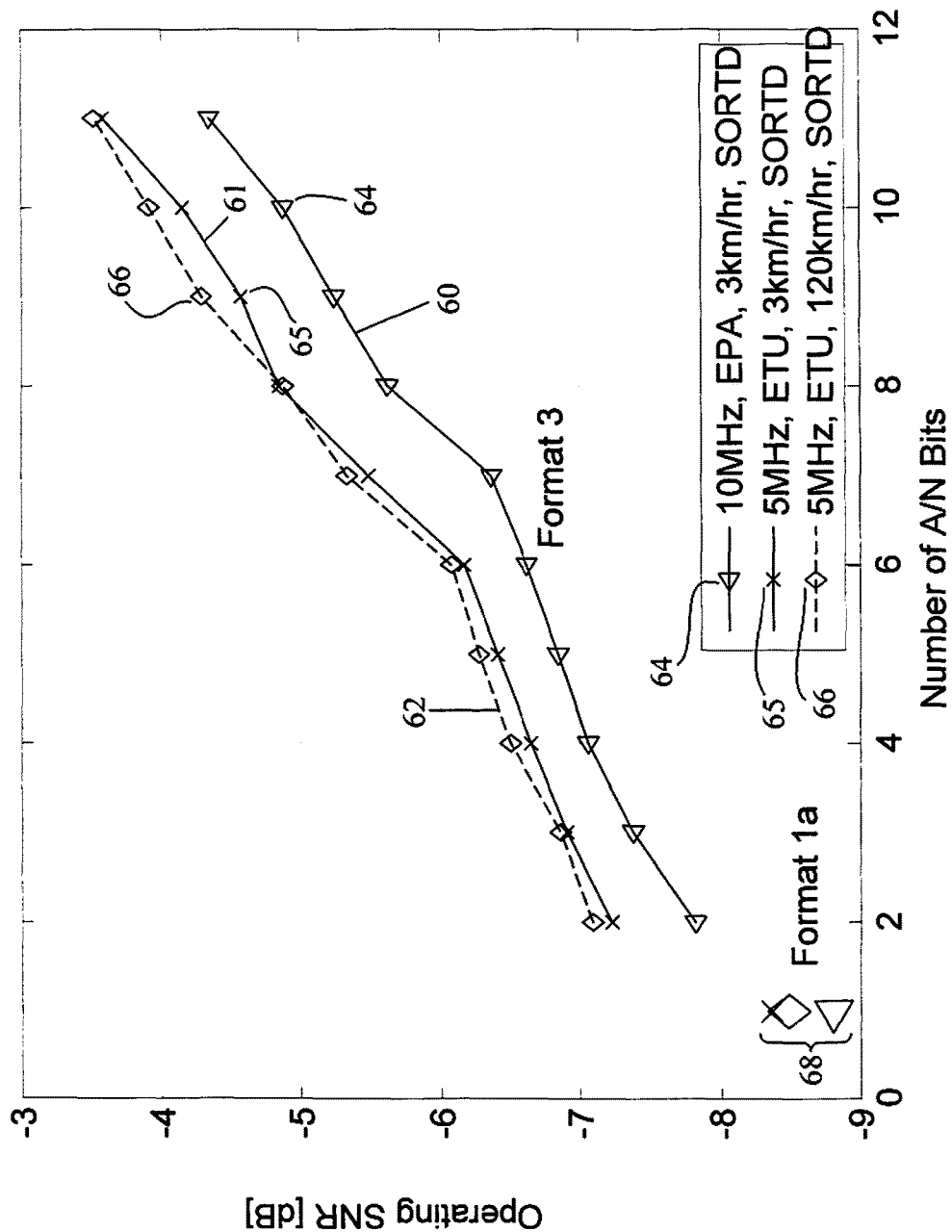
FIG. 7 illustrates simulated results for the link-level performance of Spatial Orthogonal-Resource Transmit Diversity (SORTD) for PUCCH format 3 with the ACK/NACK payload size from 2 to 11 bits.
Figure 8:
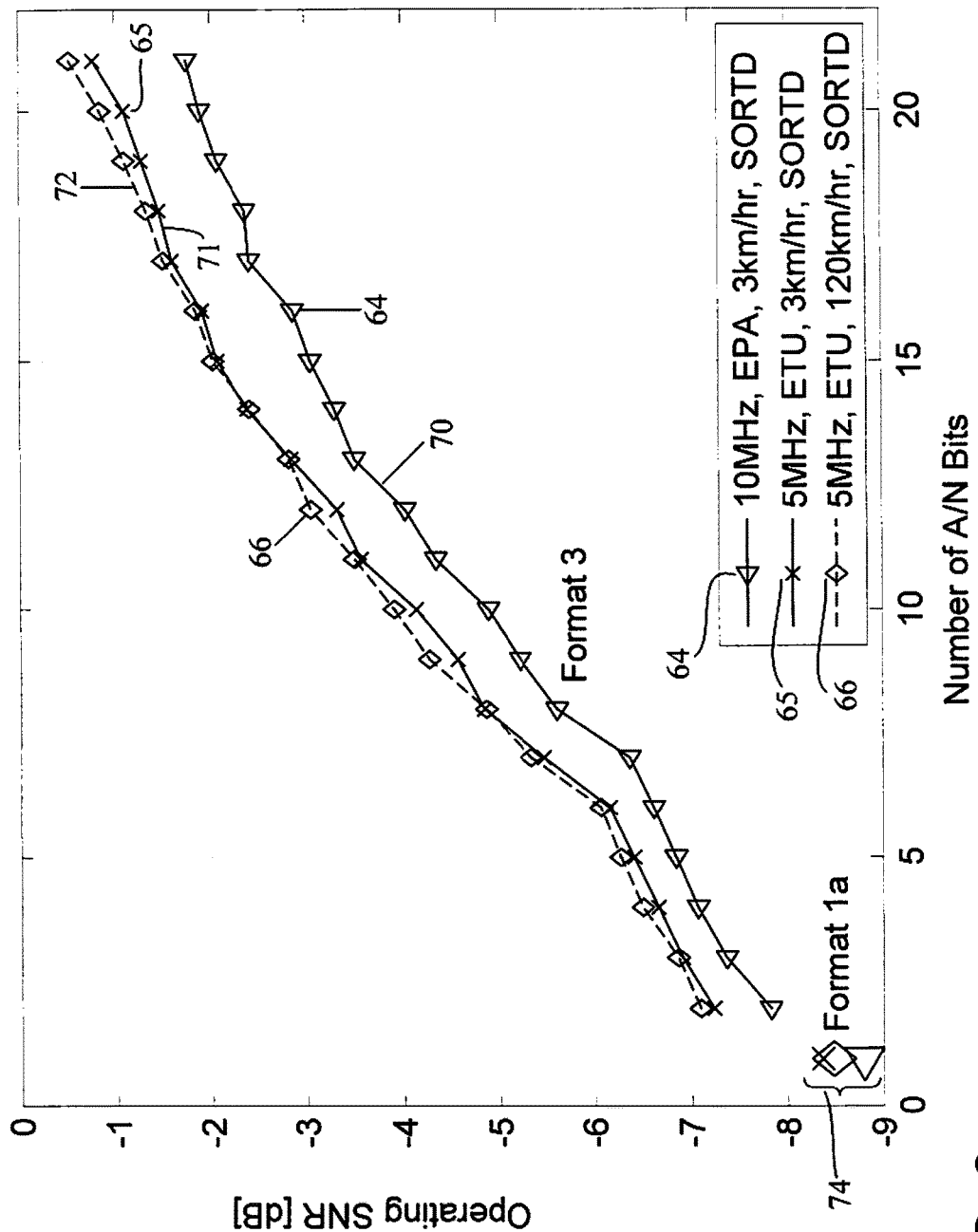
FIG. 8 illustrates simulated results for the link-level performance of SORTD for PUCCH format 3 with the ACK/NACK payload size from 2 to 21 bits.

FIG. 7 illustrates simulated results for the link-level performance of Spatial Orthogonal-Resource Transmit Diversity (SORTD) for PUCCH format 3 with the ACK/NACK payload size from 2 to 11 bits. On the other hand, FIG. 8 illustrates simulated results for the link-level performance of SORTD for PUCCH format 3 with the ACK/NACK payload size from 2 to 21 bits. Thus, in FIGS. 7 and 8 (and also in FIGS. 9-11 discussed below), the A/N payload varies between 2 and 21 bits. In the embodiments of FIGS. 7-8 (and also in FIGS. 9-11), receiver DTX detection may be based on Freq(PUCCH DTX→ACK bits)≤$10^{-2}$.

In FIG. 7, plots 60-62 are for channel models with transmit diversity (SORTD). These channel models are represented by graphical symbols (a sideways triangle, an "x" mark, and a diamond shape) identified by corresponding numerals "64", "65", and "66." As before, the simulated reference data points for PUCCH format 1a (1-bit ACK/NACK, and with transmit diversity) for these channel models are collectively identified by reference numeral "68." In FIG. 8, similar plots for PUCCH format 3 (with transmit diversity) are shown by reference numerals 70 through 72 and format 1a (with transmit diversity) data points are identified by reference numeral "74." Thus, like FIGS. 7-8, plots for format 1a in FIGS. 9-11 (discussed below) also use SORTD in correspondence with respective plots for format 3 therein (which use transmit diversity as well).

Figure 9:
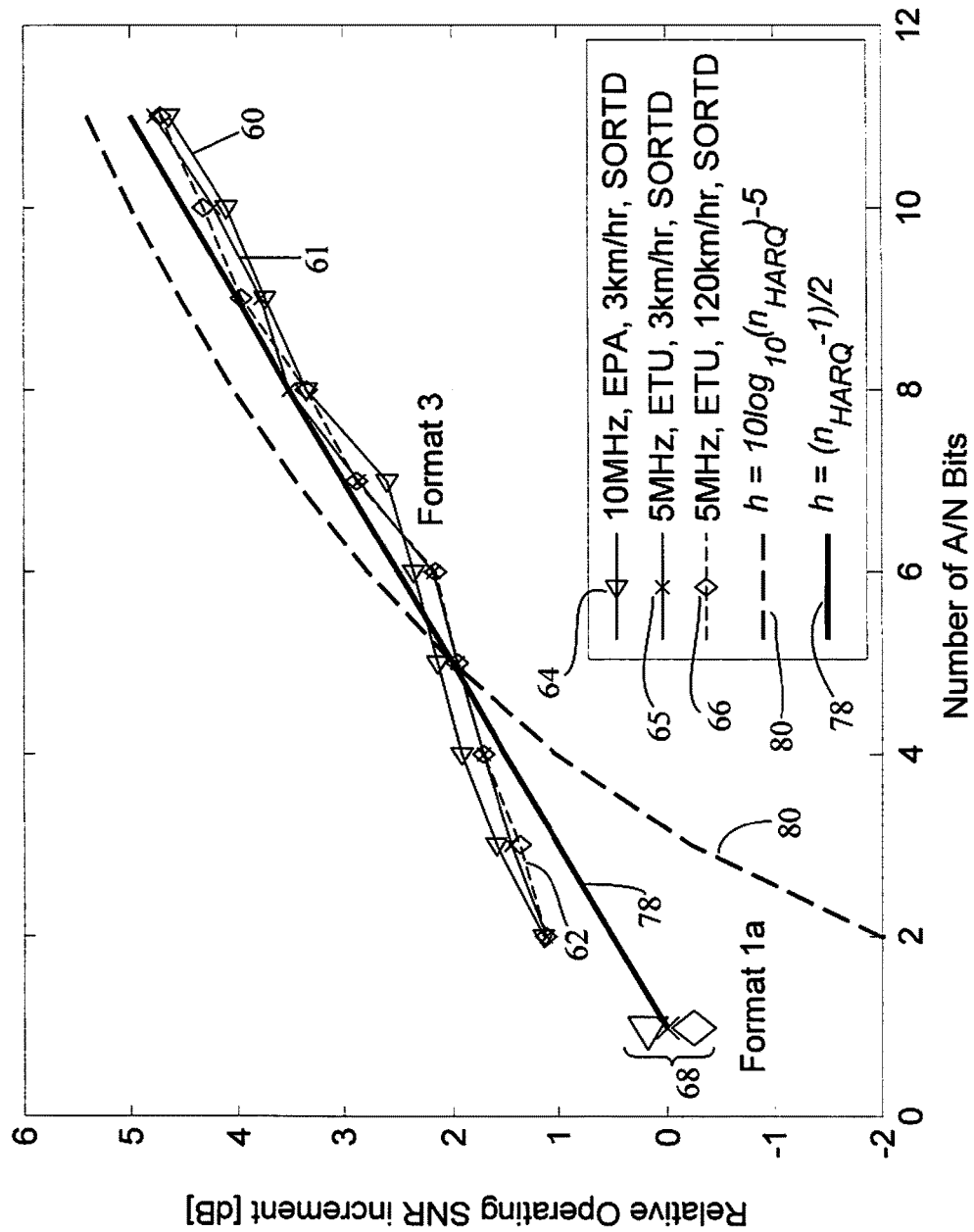
FIG. 9 depicts relative operating SNR increments for PUCCH format 3 (with transmit diversity) under different channel model assumptions shown in FIG. 7 and also illustrates that the same linear function for $h(n_{CQI}, n_{HARQ})$ initially disclosed with reference to FIG. 4 can be used to power control a PUCCH format 3 signal with transmit diversity.

FIG. 9 depicts relative operating SNR increments for PUCCH format 3 (with transmit diversity) under different channel model assumptions shown in FIG. 7 and also illustrates that the same linear function for $h(n_{CQI}, n_{HARQ})$ initially disclosed with reference to FIG. 4 can be used to power control a PUCCH format 3 signal with transmit diversity. In FIG. 9, payload size varies from 2 to 11 bits, and the relative placement of PUCCH format 3 plots 60-62 (from FIG. 7) may be accomplished in the same manner as that discussed hereinbefore with reference to FIG. 4. It is seen from FIG. 9 that the linear value for $h(n_{CQI}, n_{HARQ})$, as given by equation (2) above and plotted as plot 78 in FIG. 9, may fit the PUCCH plots 60-62 better than the suggested logarithmic value of $h(n_{CQI}, n_{HARQ})=10 \log_{10}(n_{HARQ})$ (which is depicted by plot 80 and slightly modified by deducting 5 dB to provide the closest approximation to relatively-placed graphs 60-62 in FIG. 9).

Figure 10:
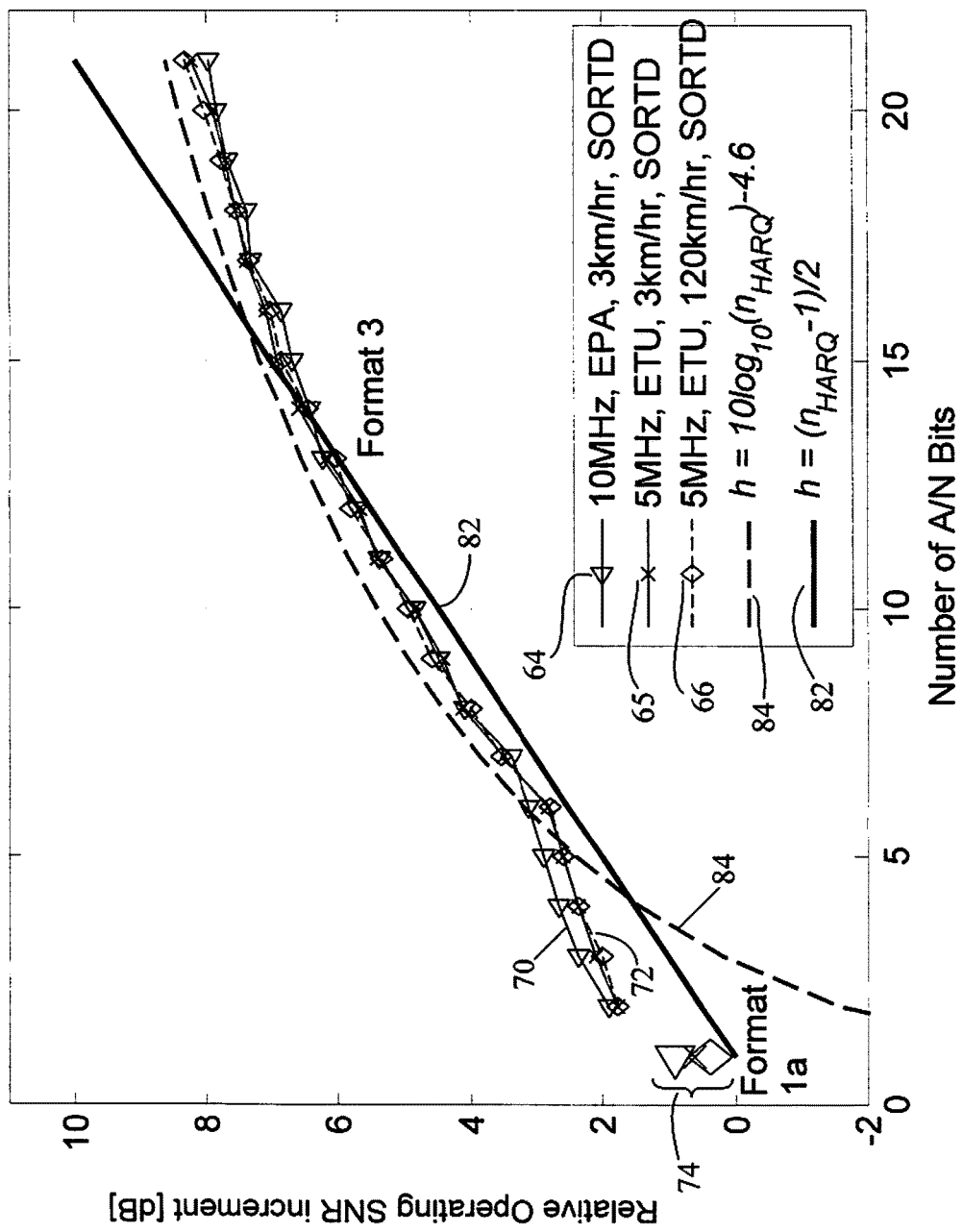
FIG. 10 depicts relative operating SNR increments for PUCCH format 3 (with transmit diversity) under different channel model assumptions shown in FIG. 8 and also illustrates that how the linear function for $h(n_{CQI}, n_{HARQ})$ initially disclosed with reference to FIG. 4 fits the PUCCH plots with transmit diversity.
Figure 11:
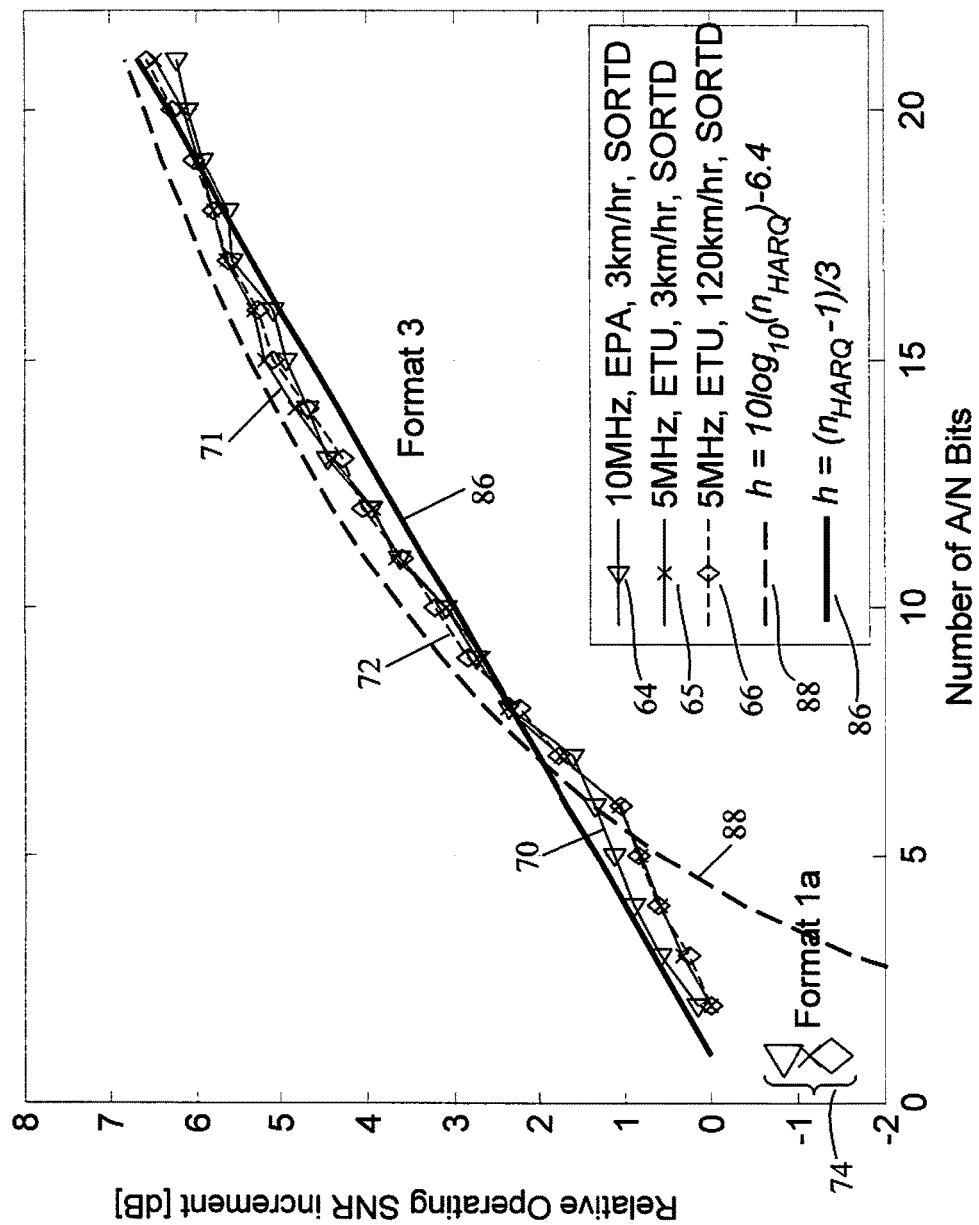
FIG. 11 also illustrates relative operating SNR increments for PUCCH format 3 (with transmit diversity) under different channel model assumptions shown in FIG. 8, but shows that a linear function for $h(n_{CQI}, n_{HARQ})$ having a slope of ⅓ may provide a better power control for PUCCH plots (with transmit diversity) in FIG. 8.

FIG. 10 depicts relative operating SNR increments for PUCCH format 3 (with transmit diversity) under different channel model assumptions shown in FIG. 8 and also illustrates that how the linear function for $h(n_{CQI}, n_{HARQ})$ initially disclosed with reference to FIG. 4 (and also as equation (2)) fits the PUCCH plots 70-72 with transmit diversity. FIG. 11 also illustrates relative operating SNR increments for PUCCH format 3 (with transmit diversity) under different channel model assumptions shown in FIG. 8, but shows that a linear function for $h(n_{CQI}, n_{HARQ})$ having a slope of ⅓ may provide a better power control for PUCCH plots 70-72 in FIG. 8. In FIGS. 10-11, the ACK/NACK payload size varies from 2 to 21 bits. In FIGS. 10-11, the relative placement of PUCCH format 3 plots 70-72 (from FIG. 8) may be accomplished in the same manner as that discussed hereinbefore with reference to FIG. 4. It is seen from FIG. 10 that the linear value for $h(n_{CQI}, n_{HARQ})$, as given by equation (2) above and plotted as plot 82 in FIG. 10, may not be a better fit for the PUCCH plots 70-72 as compared to the suggested logarithmic value of $h(n_{CQI}, n_{HARQ})=10 \log_{10}(n_{HARQ})$ (which is depicted by plot 84 and slightly modified by deducting 4.6 dB to provide the closest approximation to relatively-placed graphs 70-72 in FIG. 10). However, in case of FIG. 11, it is seen that the linear value for $h(n_{CQI}, n_{HARQ})$ (given by $$h(n_{CQI}, n_{HARQ}) = \frac{n_{HARQ} - 1}{3}$$

and plotted as plot 86 in FIG. 11) may fit the PUCCH plots 70-72 better than the suggested logarithmic value of $h(n_{CQI}, n_{HARQ})=10 \log_{10}(n_{HARQ})$ (which is depicted by plot 88 and slightly modified by deducting 6.4 dB to provide the closest approximation to relatively-placed graphs 70-72 in FIG. 11).

In the embodiments of FIGS. 7-11, Reed-Muller (RM) code may be used for encoding of PUCCH payload (A/N bits). However, since the single RM code is only defined for up to 11 bits, in one embodiment, a dual RM-code may be applied for payload (A/N bits) sizes larger than 11 bit. Thus, due to the encoder switch at 12 bit, the Signal to Interference-plus-Noise Ratio (SINR) increment may change and a single linear function (as, for example, in equation (2)) may no longer be the preferred approximation. Thus, as shown in FIG. 9—where the ACK/NACK payload sizes vary between 2 and 11 bit—it is seen that the function $$h(n_{CQI}, n_{HARQ}) = \frac{n_{HARQ} - 1}{2}$$

with slope ½ is a good match. However, in FIG. 10, where the operating SINR increment from 2 to 21 bits is shown, it can be seen that the same approximation $$h(n_{CQI}, n_{HARQ}) = \frac{n_{HARQ} - 1}{2}$$

may no longer be a good fit. Thus, in FIG. 11, the operating SINR increment is modeled with the function $$h(n_{CQI}, n_{HARQ}) = \frac{n_{HARQ} - 1}{3},$$

which may provide a better fit.

In one embodiment, the operating SINR increase for PUCCH Format 3 with SORTD (transmit diversity) may be modeled for all ACK/NACK payload sizes with the same linear function, e.g., $$h(n_{CQI}, n_{HARQ}) = \frac{n_{HARQ} - 1}{3}.$$

In another embodiment, the operating SINR may be approximated with different functions for $h(n_{CQI}, n_{HARQ})$ depending on the ACK/NACK payload size, e.g., $$h(n_{CQI}, n_{HARQ}) = \frac{n_{HARQ} - 1}{2}$$

may be used for up to 11 A/N bits, and for 12 bits and above $$h(n_{CQI}, n_{HARQ}) = \frac{n_{HARQ} - 1}{3}$$

may be used. Thus, the eNB 16 may instruct the UE 12 to either apply a single function or a combination of functions for $h(n_{CQI}, n_{HARQ})$ depending on the payload size in the PUCCH format 3 signal (with transmit diversity) to be transmitted by the UE 12.

In one embodiment, instead of basing the function $h(n_{CQI}, n_{HARQ})$ (which may be linear as given by equation (3) above or may be non-linear as the proposed log-based formula for $h(n_{CQI}, n_{HARQ})$ in Rel-10) only on the ACK/NACK payload size, one may also consider if a given PUCCH format (e.g., PUCCH format 1a, 2, 2a, 3, etc.) uses transmit diversity or not. Thus, $h(n_{CQI}, n_{HARQ})$ (linear or non-linear) may be generalized into $h(n_{CQI}, n_{HARQ}, s_{TxD})$, where the parameter $s_{TxD}$ indicates if transmit diversity is used or not. In case of presence of transmit diversity, additional considerations may apply as discussed below.

In one embodiment, the operating SINR increase for a given PUCCH format (with transmit diversity) may be relative to the SINR required for PUCCH format 1a without transmit diversity. If, however, PUCCH format 1a also uses transmit diversity, the difference between the SINR values for PUCCH format 1a (with transmit diversity) and the given PUCCH format (with transmit diversity) may increase. The function $h(n_{CQI}, n_{HARQ})$ (linear or non-linear) may therefore not only depend on if the given PUCCH format (e.g., PUCCH format 2, 2a, 3, etc.) uses transmit diversity, but also if PUCCH format 1a uses transmit diversity. In this situation, up to four different functions for $h(n_{CQI}, n_{HARQ})$ (e.g., each may be linear in the form given by equation (3) and may have a different slope and/or "β" as determined according to the teachings of the present invention, or each may be non-linear as in case of the proposed logarithmic function in Rel-10, or there may be a combination of linear and non-linear functions depending on the given PUCCH format) may be provided for the four cases involving PUCCH format 1a with/without TxD and the given PUCCH format (e.g., PUCCH format 2a, 3, etc.) with/without transmit diversity. These four functions may be network-specific and may be stored in a memory (shown in FIG. 12) in the UE 12 prior to UE's operation in the network 14, or, alternatively, these functions may be provided by the eNB 16 (as per network implementation) and stored in UE's memory upon UE's 12 initial connection to the network 14. Depending on its configuration (e.g., with carrier aggregation, without carrier aggregation, with/without transmit diversity, etc.), for example, by the eNB 16, in one embodiment, the UE 12 may choose one out of these four functions from its memory.

In one embodiment, a new offset parameter (referred to herein as "$\Delta_{TxD}(F)$"), which may be independent of and not part of the $h(n_{CQI}, n_{HARQ})$ function (whether linear or non-linear), may be signaled (e.g., by eNB 16) as a power control parameter for each PUCCH format that has transmit diversity configured. If UE is configured by higher layers to transmit PUCCH on two antenna ports (i.e., with transmit diversity), then the value of $\Delta_{TxD}(F)$ may be provided by higher layers as discussed in 3GPP TS 36.213 (Release 10), where each PUCCH format "F" is defined in 3GPP TS 36.211: "Evolved Universal Terrestrial Radio Access (E-UTRA); Physical channels and modulation." In one embodiment, for PUCCH format 3 (with transmit diversity), some exemplary values for $\Delta_{TxD}(F)$ may be 0 dB and −1 dB as can be observed from a comparison of FIGS. 3 and 7. In another embodiment, some exemplary values for $\Delta_{TxD}(F)$ may be 0 dB and −2 dB. Equation (4) below is a modified version of equation (1) including this new parameter $\Delta_{TxD}(F)$:

$$P_{PUCCH}(i) = \min\{P_{CMAX}, P_{0\_PUCCH} + PL + h(n_{CQI}, n_{HARQ}) + \Delta_{F\_PUCCH}(F) + g(i) + \Delta_{TxD}(F)\} \quad (4)$$

It is observed here that $\Delta_{TxD}(F)$ is shown as a separate parameter in equation (4) and may not affect the value of $h(n_{CQI}, n_{HARQ})$. However, in one embodiment, $\Delta_{TxD}(F)$ may be part of $h(n_{CQI}, n_{HARQ})$ in the overall power control formula and, hence, may affect the value of $h(n_{CQI}, n_{HARQ})$.

In one embodiment, if PUCCH format 1a with/without transmit diversity only influences this new parameter $\Delta_{TxD}(F)$, but not the slope of the approximation for $h(n_{CQI}, n_{HARQ})$ (whether linear or non-linear), then the same value for $h(n_{CQI}, n_{HARQ})$ may be used for a given PUCCH format (e.g., PUCCH format 2, 2a, 3, etc.) regardless of whether this given PUCCH format is with/without transmit diversity, and this value of "h" may be independent of PUCCH format 1a with/without transmit diversity. In this case, the UE 12 may be configured (e.g., by the manufacturer of the UE 12 or an operator of the network 14) to select a value for the offset parameter $\Delta_{TxD}(F)$, depending on PUCCH Format 1a with/without transmit diversity. In one embodiment, various values of $\Delta_{TxD}(F)$ may be stored in UE's memory. Alternatively, the network 14 (e.g., through the eNB 16) may signal the offset ($\Delta_{TxD}(F)$) to the UE 12 (e.g., via a DCI message on a PDCCH signal). It is noted here that, in case of transmit diversity, the selection of a value for $h(n_{CQI}, n_{HARQ})$, or, alternatively, for the offset parameter $\Delta_{TxD}(F)$, may be UE-specific since the transmit diversity configuration is UE-specific. Thus, in contrast to the parameter "β" in equation (3) above, in case of transmit diversity, the offset parameter $\Delta_{TxD}(F)$ may not be included in the cell-specific parameter $\Delta_{F\_PUCCH}(F)$.

It is noted here that although the foregoing discussion (including discussions related to linearity-based determination of $h(n_{CQI}, n_{HARQ})$, usage of offset parameter $\Delta_{TxD}(F)$, etc.) is provided in the context of SORTD, the same discussion applies for any other transmit diversity scheme as well. Thus, in one embodiment, the function $h(n_{CQI}, n_{HARQ})$ approximating the operating SINR depends if transmit diversity is used or not. Furthermore, the foregoing disclosures of determining the value of PUCCH power control parameter $h(n_{CQI}, n_{HARQ})$ as a linear function of $n_{HARQ}$ and usage of the offset parameter $\Delta_{TxD}(F)$ independent of the "h" function are also not limited to transmit diversity applied to PUCCH Format 3; the disclosures may be utilized with any other appropriate PUCCH format as well (whether used in conjunction with carrier aggregation or not).

Figure 12:
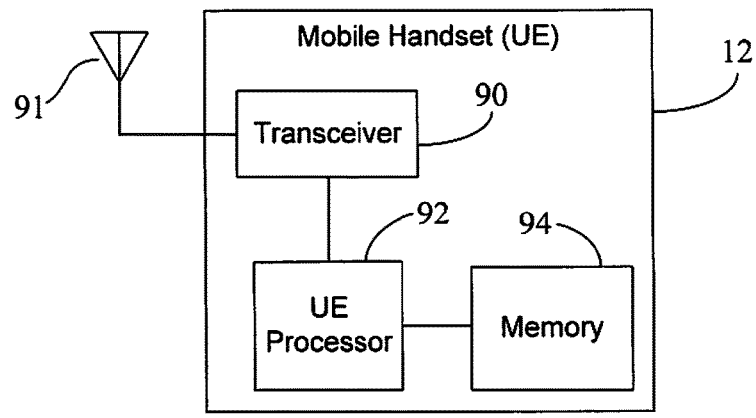
FIG. 12 is a block diagram of an exemplary mobile handset or UE 12 according to one embodiment of the present invention.

FIG. 12 is a block diagram of an exemplary mobile handset or UE 12 according to one embodiment of the present invention. The UE 12 may include a transceiver 90, an antenna 91, a processor 92, and a memory 94. In particular embodiments, some or all of the functionalities described above (e.g., reception of TPC commands from the eNB 16 via the antenna 91 and transceiver 90; storage of appropriate values for $h(n_{CQI}, n_{HARQ})$, $\Delta_{F\_PUCCH}(F)$, and $\Delta_{TxD}(F)$, and selection of specific values as per instructions from the eNB 16; transmission of a PUCCH signal to eNB 16 with desired power control via transceiver 90 and antenna 91; etc.) as being provided by mobile communication devices or other forms of UE may be provided by the UE processor 92 executing instructions stored on a computer-readable medium, such as the memory 94 shown in FIG. 12. Alternative embodiments of the UE 12 may include additional components beyond those shown in FIG. 12 that may be responsible for providing certain aspects of the UE's functionality, including any of the functionality described above and/or any functionality necessary to support the solution described above.

Figure 13:
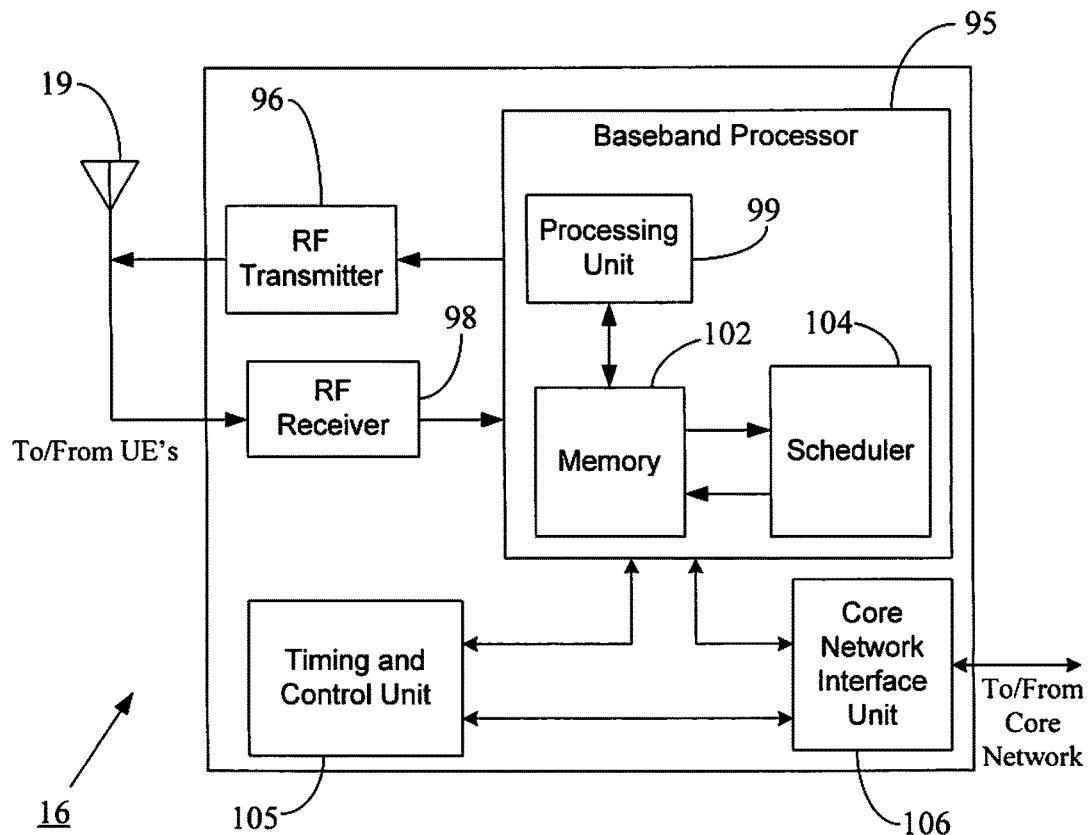
FIG. 13 is a block diagram of an exemplary eNodeB according to an exemplary embodiment of the present invention.

FIG. 13 is a block diagram of an exemplary eNodeB (or a similar communication node) 16 according to one embodiment of the present invention. The eNodeB 16 may include a baseband processor 95 to provide radio interface with the mobile handsets (in the carrier network 14) via eNodeB's Radio Frequency (RF) transmitter 96 and RF receiver 98 units coupled to the eNodeB antenna 19. The processor 95 may be configured (in hardware and/or software) to perform determinations of $h(n_{CQI}, n_{HARQ})$ and $\Delta_{F\_PUCCH}(F)$ as per the teachings of the present invention and instruct the UE 12 via appropriate downlink signals (e.g., the PDCCH signal) to apply the determined values as part of UE's power control of the PUCCH signals to be transmitted by the UE 12. In one embodiment, the processor 95 may also determine and supply values for the parameter $\Delta_{TxD}(F)$ to the UE 12 (e.g., via the PDCCH signal). In the context of FIG. 13, the transmissions from the UE 12 may be received at the receiver 98, whereas eNB's transmissions to the UE 12 may be carried out via the transmitter 96. The baseband processor 95 may include a processing unit 99 in communication with a memory 102 to provide the determinations of, for example, $h(n_{CQI}, n_{HARQ})$ and $\Delta_{F\_PUCCH}(F)$ to the UE 12 as per the teachings of the present invention. A scheduler (e.g., the scheduler 104 in FIG. 13) in the eNB 36 may provide the scheduling decision for UE 12 based on a number of factors such as, for example, QoS (Quality of Service) parameters, UE buffer status, uplink channel quality report received from UE 12, UE capabilities, etc. The scheduler 104 may have the same data structure as a typical scheduler in an eNB in an LTE system.

The processor 95 may also provide additional baseband signal processing (e.g., mobile device registration, channel signal information transmission, radio resource management, etc.) as required. The processing unit 99 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described above as being provided by a mobile base station, a base station controller, a node B, an enhanced node B, and/or any other type of mobile communications node may be provided by the processing unit 99 executing instructions stored on a computer-readable data storage medium, such as the memory 102 shown in FIG. 13.

The eNodeB 16 may further include a timing and control unit 104 and a core network interface unit 105 as illustrated in FIG. 13. The control unit 104 may monitor operations of the processor 95 and the network interface unit 106, and may provide appropriate timing and control signals to these units. The interface unit 106 may provide a bi-directional interface for the eNodeB 16 to communicate with the core network 18 to facilitate administrative and call-management functions for mobile subscribers operating in the carrier network 14 through eNodeB 16.

Alternative embodiments of the base station 16 may include additional components responsible for providing additional functionality, including any of the functionality identified above and/or any functionality necessary to support the solution described above. Although features and elements are described above in particular combinations, each feature or element can be used alone without the other features and elements or in various combinations with or without other features and elements. The methodology provided herein (related to the determinations of $h(n_{CQI}, n_{HARQ})$, $\Delta_{F\_PUCCH}(F)$, and $\Delta_{TxD}(F)$) may be implemented in a computer program, software, or firmware incorporated in a computer-readable storage medium (e.g., the memory 102 in FIG. 13 and memory 94 in FIG. 12)) for execution by a general purpose computer or a processor (e.g., the processor 92 in FIG. 12 and processing unit 99 in FIG. 13). Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs).

The foregoing describes a system and method to determine the PUCCH power control parameter $h(n_{CQI}, n_{HARQ})$ more accurately for the two CA PUCCH formats—PUCCH format 3 and channel selection—in LTE Rel-10. In one embodiment of the present invention, $h(n_{CQI}, n_{HARQ})$ is based on a linear function of $n_{HARQ}$ for both of the CA PUCCH formats in Rel-10. Based on the CA PUCCH format configured for the UE, the eNB may instruct the UE (e.g., via the TPC bit field in the PDCCH signal from the eNB) to select or apply a specific linear function of $n_{HARQ}$ as a value for the power control parameter $h(n_{CQI}, n_{HARQ})$, so as to enable the UE to more accurately establish transmit power of its PUCCH signal. The present invention also provides exemplary values for the parameter $\Delta_{F\_PUCCH}(F)$ to be used for the PUCCH format 3 in Rel-10. Furthermore, a new parameter—$\Delta_{TxD}(F)$ may be signaled for each PUCCH format that has transmit diversity configured.

The linear determination of $h(n_{CQI}, n_{HARQ})$ (and resulting values for $\Delta_{F\_PUCCH}(F)$) according to the teachings of the present invention may provide a more accurate power control for the two PUCCH formats in Rel-10 compared to a logarithmic determination. More accurate power control may lead to less inter-cell interference and high multiplexing capability on PUCCH, and therefore also higher system throughput on PDSCH because higher ACK/NACK throughput in UL may result in better data throughput in DL for a UE. It is noted here that the teachings of the present invention related to power control of uplink signaling may be applied, with suitable modifications (as may be apparent to one skilled in the art using the present teachings), to other wireless systems as well—e.g., Wideband Code Division Multiple Access (WCDMA) systems, WCDMA-based High Speed Packet Access (HSPA) systems, CDMA2000 systems, Global System for Mobile Communications/Enhanced Data Rate for GSM Evolution (GSM/EDGE) systems, and Worldwide Interoperability for Microwave Access (Wi-MAX) systems.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A User Equipment (UE), operable in a wireless network associated therewith, the UE comprising a processor and a memory, wherein when the processor executes computer program instructions stored in the memory, the UE is caused to:
   receive a power control signal from a mobile communication node to control transmit power of a Physical Uplink Control Channel (PUCCH) signal, wherein the PUCCH signal includes exactly three Hybrid Automatic Repeat Request (HARQ) bits;
   wherein the PUCCH format uses transmit diversity and the power control signal provides an offset value in a power control function affecting the transmit power of the PUCCH signal, and wherein the offset value compensates for an operating signal-to-noise ratio (SNR) improvement that occurs when the mobile communication node increases a Discontinuous Transmission (DTX) detection threshold when the PUCCH signal includes exactly three HARQ bits;
   apply the power control function with the offset value to the PUCCH signal to determine a transmit power of the PUCCH signal that is reduced by the offset value; and
   transmit the PUCCH signal with the determined transmit power.

2. The UE as recited in claim 1, wherein the UE is also caused to ensure the PUCCH signal is transmitted with sufficient power to enable the mobile communication node to accurately decode HARQ-ACK feedback from the UE.

3. A mobile communication node for controlling transmit power of a Physical Uplink Control Channel (PUCCH) signal to be transmitted by a User Equipment (UE) in wireless communication with the mobile communication node via a wireless network associated therewith, wherein the PUCCH signal to be transmitted by the UE includes exactly three Hybrid Automatic Repeat Request (HARQ) bits, the mobile communication node comprising a processor and a memory, wherein when the processor executes computer program instructions stored in the memory, the mobile communication node is caused to:
   increase a Discontinuous Transmission (DTX) detection threshold, thereby causing an operating signal-to-noise ratio (SNR) improvement;
   generate a power control signal for transmission to the UE to control transmit power of the PUCCH signal, wherein the mobile communication node includes in the power control signal, an offset value in a power control function affecting the transmit power of the PUCCH signal, and wherein the offset value compensates for the operating SNR improvement that occurs when the mobile communication node increases the DTX detection threshold; and
   transmit the power control signal to the UE, thereby instructing the UE to lower the transmit power of the PUCCH signal by the offset value by applying the power control function with the offset value to the PUCCH signal to be transmitted by the UE.

4. A system in a wireless network, comprising:
   a User Equipment (UE) operable in the wireless network; and
   a mobile communication node in the wireless network configured to control transmit power of a Physical Uplink Control Channel (PUCCH) signal to be transmitted by the UE, wherein the PUCCH signal to be transmitted by the UE includes exactly three Hybrid Automatic Repeat Request (HARQ) bits;
   wherein the mobile communication node includes a processor and a memory, wherein when the processor executes computer program instructions stored in the memory, the mobile communication node is caused to:
   increase a Discontinuous Transmission (DTX) detection threshold, thereby causing an operating signal-to-noise ratio (SNR) improvement;
   generate a power control signal for transmission to the UE to control transmit power of the PUCCH signal, wherein the mobile communication node includes in the power control signal, an offset value in a power control function affecting the transmit power of the PUCCH signal, and wherein the offset value compensates for the operating SNR improvement that occurs when the mobile communication node increases the DTX detection threshold; and
   transmit the power control signal to the UE, thereby instructing the UE to lower the transmit power of the PUCCH signal by the offset value by applying the power control function with the offset value to the PUCCH signal to be transmitted by the UE.

5. The system as recited in claim 4, wherein the UE includes a processor and a memory, wherein when the processor executes computer program instructions stored in the memory, the UE is caused to:
- receive the power control signal from the mobile communication node;
- apply the power control function with the offset value to the PUCCH signal to determine a transmit power of the PUCCH signal that is reduced by the offset value; and
- transmit the PUCCH signal with the determined transmit power.

* * * * *

UNITED STATES PATENT AND TRADEMARK OFFICE
CERTIFICATE OF CORRECTION

PATENT NO. : 9,848,390 B2
APPLICATION NO. : 14/807585
DATED : December 19, 2017
INVENTOR(S) : Baldemair et al.

Page 1 of 2

It is certified that error appears in the above-identified patent and that said Letters Patent is hereby corrected as shown below:

In the Specification

In Column 1, Line 8, delete "2013," and insert -- 2013, now Pat. No. 9,125,161, --, therefor.

In Column 1, Line 10, delete "2011," and insert -- 2011, now Pat. No. 8,582,518, --, therefor.

In Column 2, Line 45, delete "UE's operating" and insert -- UEs operating --, therefor.

In Column 2, Line 45, delete "UE's" and insert -- UEs --, therefor.

In Column 2, Line 47, delete "UE's"," and insert -- UEs", --, therefor.

In Column 2, Line 47, delete "UE's" and insert -- UEs --, therefor.

In Column 2, Line 49, delete ""Advanced-UE's"." and insert -- "Advanced-UEs". --, therefor.

In Column 4, Line 19, delete "1, 1 a, 1 b, 2, 2a," and insert -- 1, 1a, 1b, 2, 2a, --, therefor.

In Column 4, Line 20, delete "1/1a/1 b" and insert -- 1/1a/1b --, therefor.

In Column 5, Line 22, delete "$n_{CQI}$)," and insert -- $n_{CQI}$ --, therefor.

In Column 9, Line 7, delete "(UE's)." and insert -- (UEs). --, therefor.

In Column 11, Line 35, delete "$h(n_{CQI}, n_{HARQ})$—" and insert -- $h(n_{CQI}, n_{HARQ})$. --, therefor.

In Column 11, Line 45, delete "1a/1 b," and insert -- 1a/1b, --, therefor.

In Column 11, Line 54, delete "Ratio)" and insert -- Ratios) --, therefor.

Signed and Sealed this
Twenty-eighth Day of May, 2019

Andrei Iancu
*Director of the United States Patent and Trademark Office*

CERTIFICATE OF CORRECTION (continued)
U.S. Pat. No. 9,848,390 B2

In Column 12, Line 1, delete "UE's" and insert -- UEs --, therefor.

In Column 17, Line 14, delete "control." and insert -- control, --, therefor.

In Column 17, Line 60, delete "transmit diversity (SORTD)." and insert -- spatial orthogonal-resource transmit diversity (SORTD). --, therefor.

In Column 22, Line 58, delete "FIG. 12))" and insert -- FIG. 12) --, therefor.